(12) United States Patent
Sakamaki et al.

(10) Patent No.: US 8,299,807 B2
(45) Date of Patent: Oct. 30, 2012

(54) FOREIGN OBJECT DETECTION SENSOR AND METHOD FOR MANUFACTURING THE SAME

(75) Inventors: Ryousuke Sakamaki, Kosai (JP); Akihiro Tanba, Hitachinaka (JP); Takashi Aoyama, Hitachi (JP); Akio Hattori, Hitachi (JP); Teruji Sato, Hitachi (JP); Tatsuya Ohtaka, Hitachi (JP)

(73) Assignees: ASMO Co., Ltd., Kosai, Shizuoka-Pref. (JP); Hitachi Cable, Ltd., Tokyo (JP)

( * ) Notice: Subject to any disclaimer, the term of this patent is extended or adjusted under 35 U.S.C. 154(b) by 429 days.

(21) Appl. No.: 12/659,072

(22) Filed: Feb. 24, 2010

(65) Prior Publication Data
US 2010/0219844 A1 Sep. 2, 2010

(30) Foreign Application Priority Data
Feb. 27, 2009 (JP) ................................. 2009-047199

(51) Int. Cl.
*G01R 27/26* (2006.01)
(52) U.S. Cl. ........................................ 324/663; 324/658
(58) Field of Classification Search .................. 324/658, 324/661, 663, 671
See application file for complete search history.

(56) References Cited

U.S. PATENT DOCUMENTS

| | | | |
|---|---|---|---|
| 6,260,418 B1 | 7/2001 | Ishihara et al. | |
| 6,349,461 B2 | 2/2002 | Ishihara et al. | |
| 6,431,004 B2 | 8/2002 | Ishihara et al. | |
| 7,534,957 B2 | 5/2009 | Yamaura et al. | |
| 2008/0180114 A1* | 7/2008 | Fujiwara et al. | 324/663 |

FOREIGN PATENT DOCUMENTS

| | | |
|---|---|---|
| JP | 11-237289 | 8/1999 |
| JP | 2007-123202 | 5/2007 |

* cited by examiner

*Primary Examiner* — Vincent Q Nguyen
(74) *Attorney, Agent, or Firm* — McGinn IP Law Group, PLLC

(57) ABSTRACT

A foreign objection detection sensor has a lengthy sensor part having a sensor electrode having a first sensor electrode which detects a proximity of a foreign object and a second sensor electrode which detects a contact of the foreign object, a sensor terminal part provided at one end of the sensor part, a leading wire pulled out from the sensor terminal part, the leading wire being electrically connected to the sensor electrode at the sensor terminal part to provide a proximity detecting function for detecting the proximity of the foreign object to the sensor part and a contact detecting function for detecting the contact of the foreign object to the sensor part. The sensor terminal part has a support member which supports a detection circuit unit electrically connected to the sensor electrode to carry out the proximity detecting function and the contact detecting function together with the sensor electrode. The detection circuit unit is disposed in the support member.

29 Claims, 12 Drawing Sheets

PASSENGER
COMPARTMENT INSIDE

FRONT ←→ REAR

PASSENGER
COMPARTMENT OUTSIDE
(VEHICLE WIDTH)

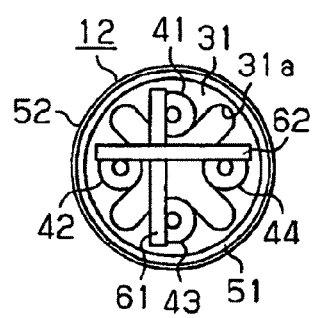 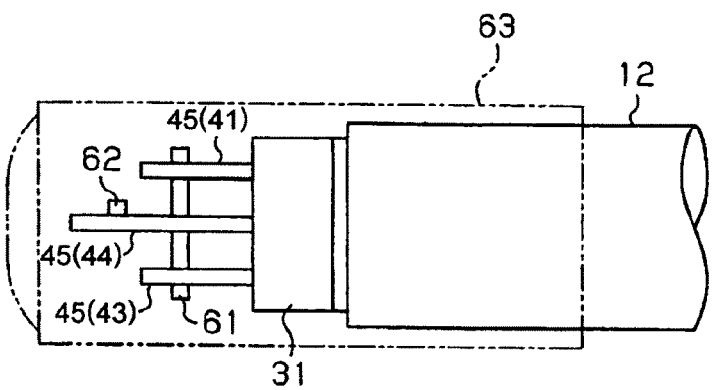
FIG.4A FIG.4B
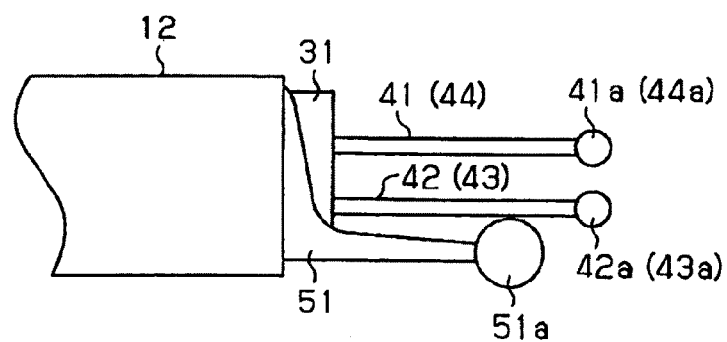
FIG.5

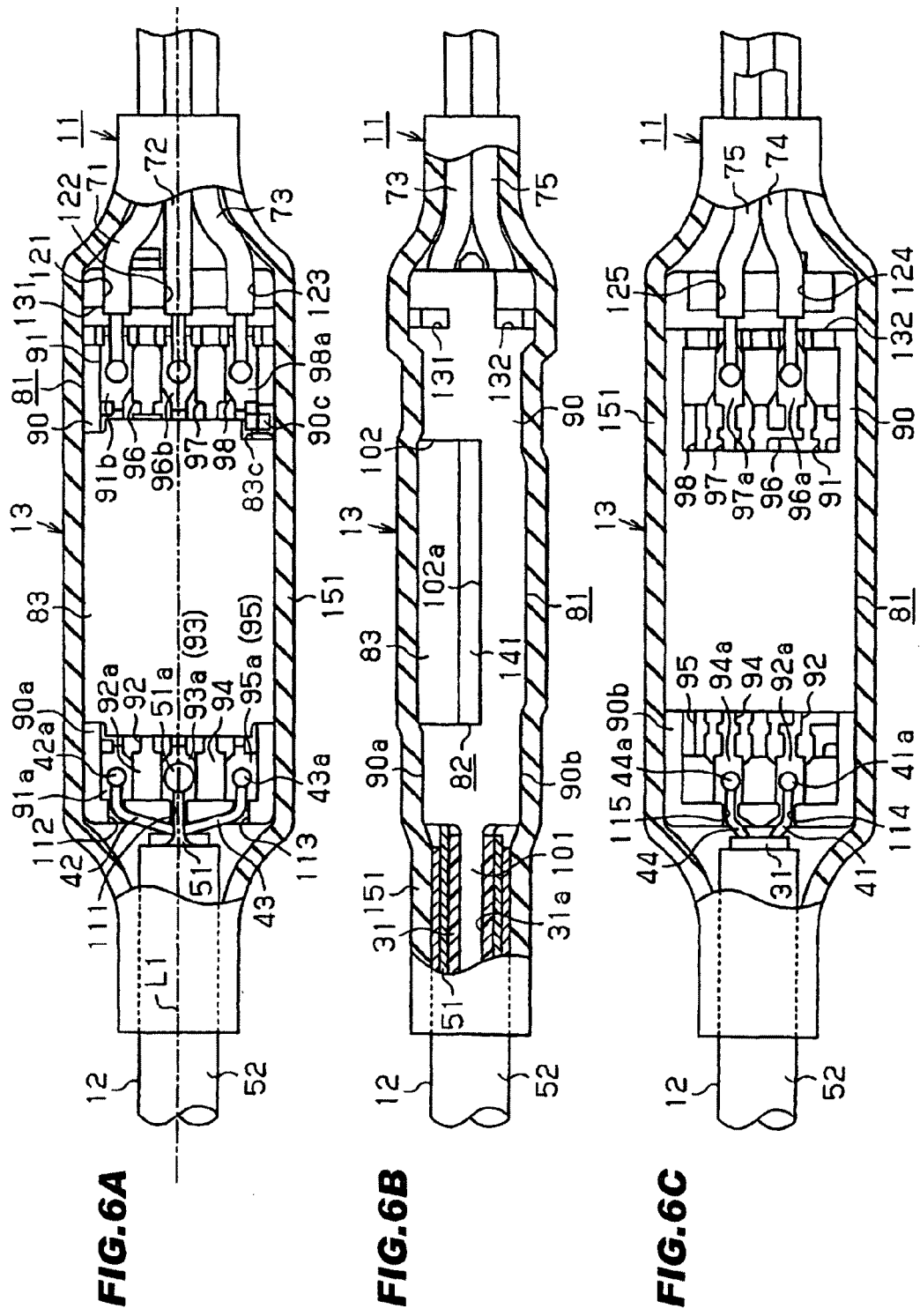

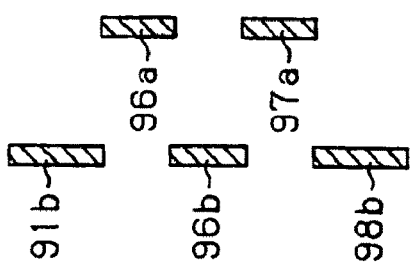
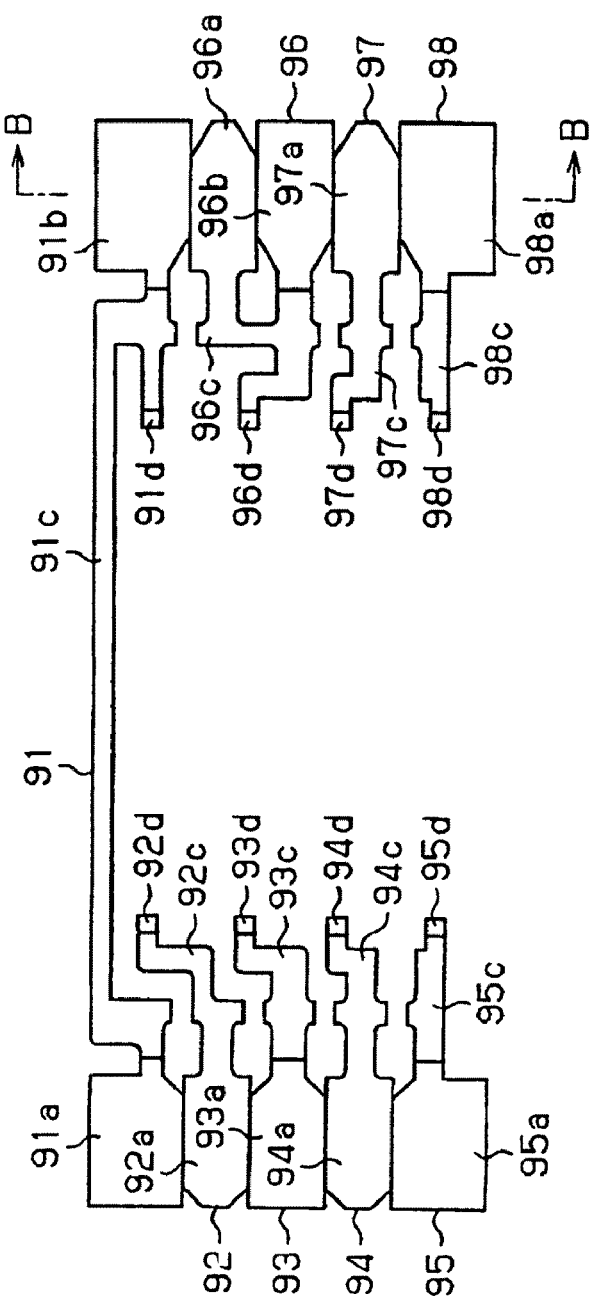
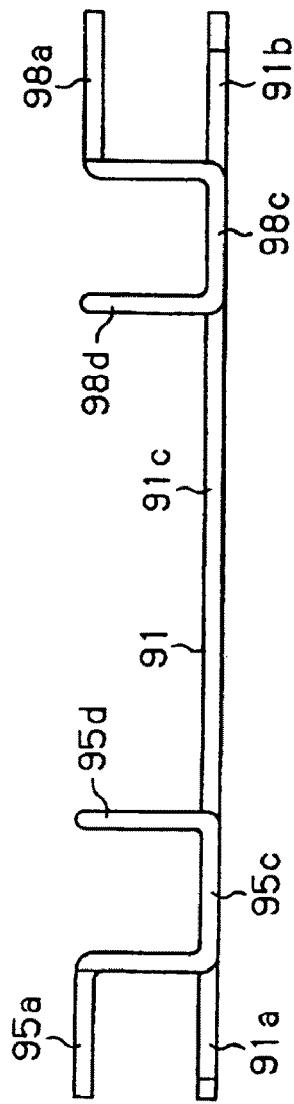

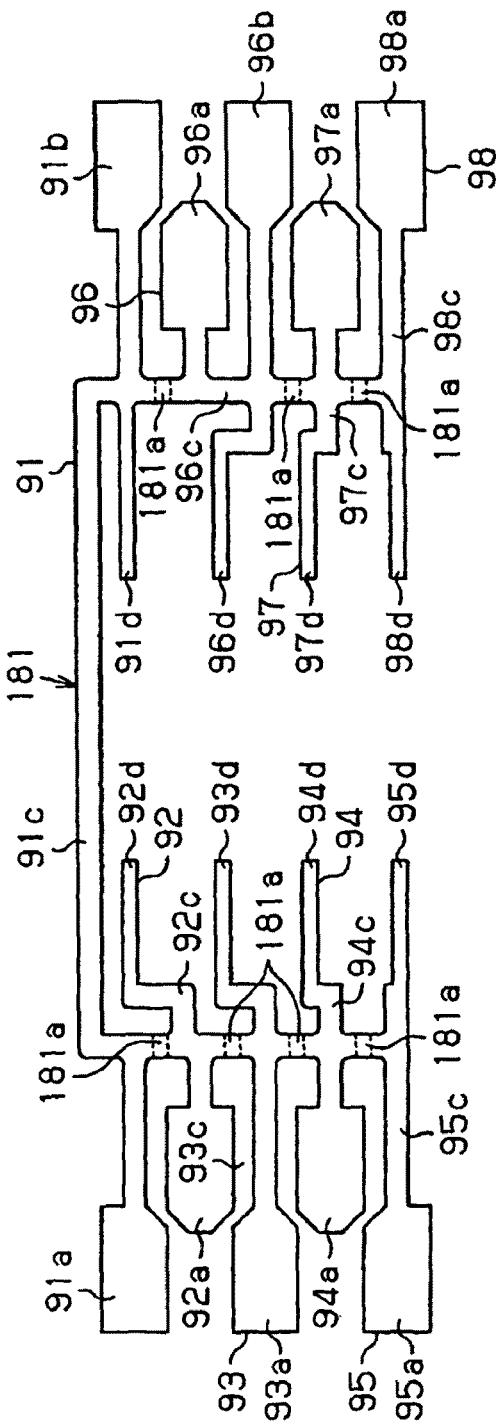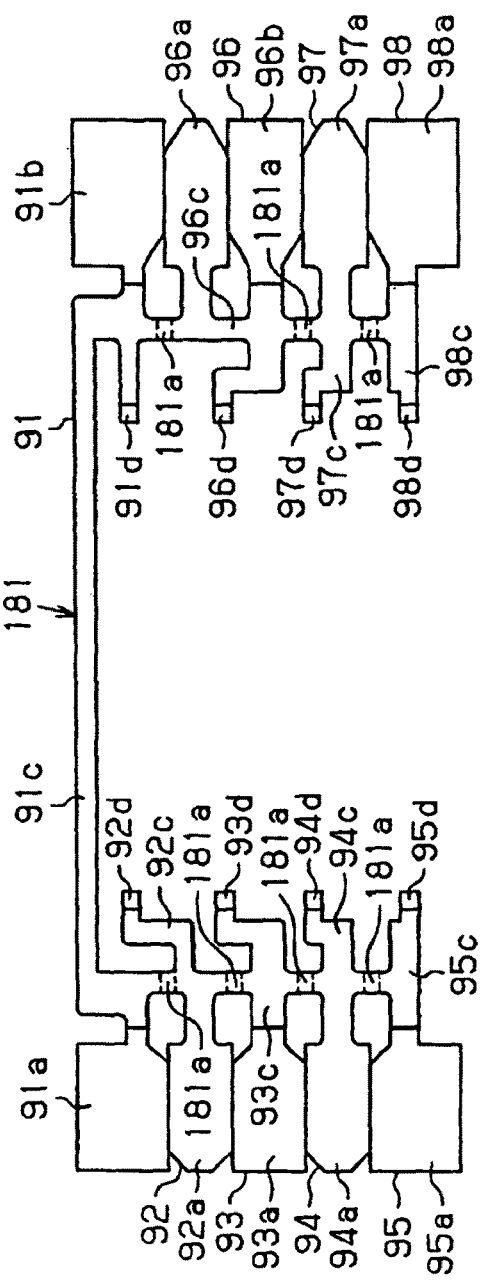
FIG.13A
FIG.13B

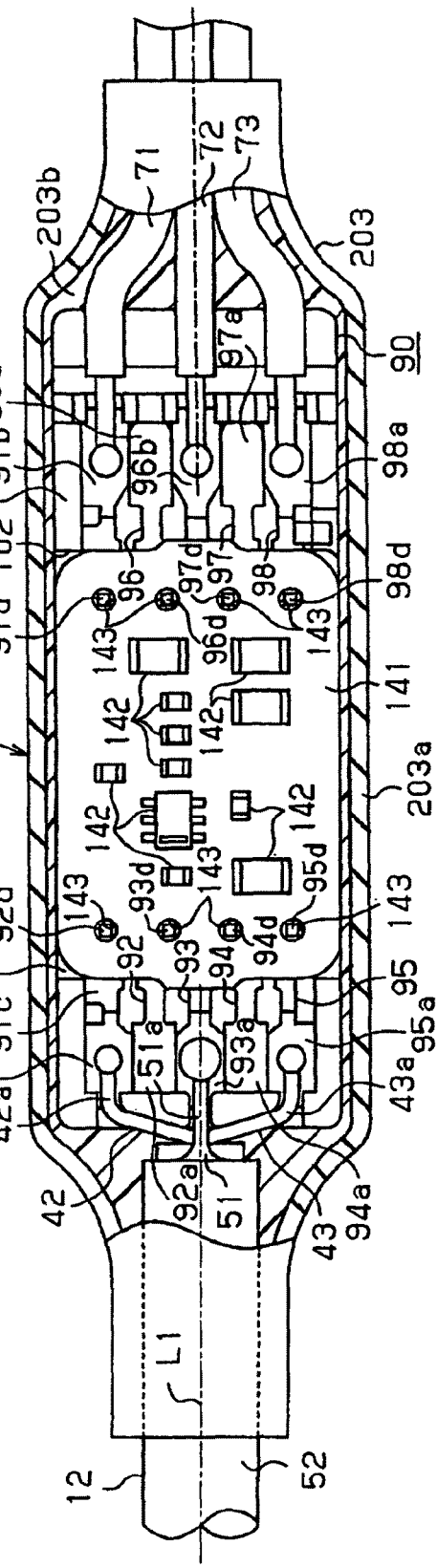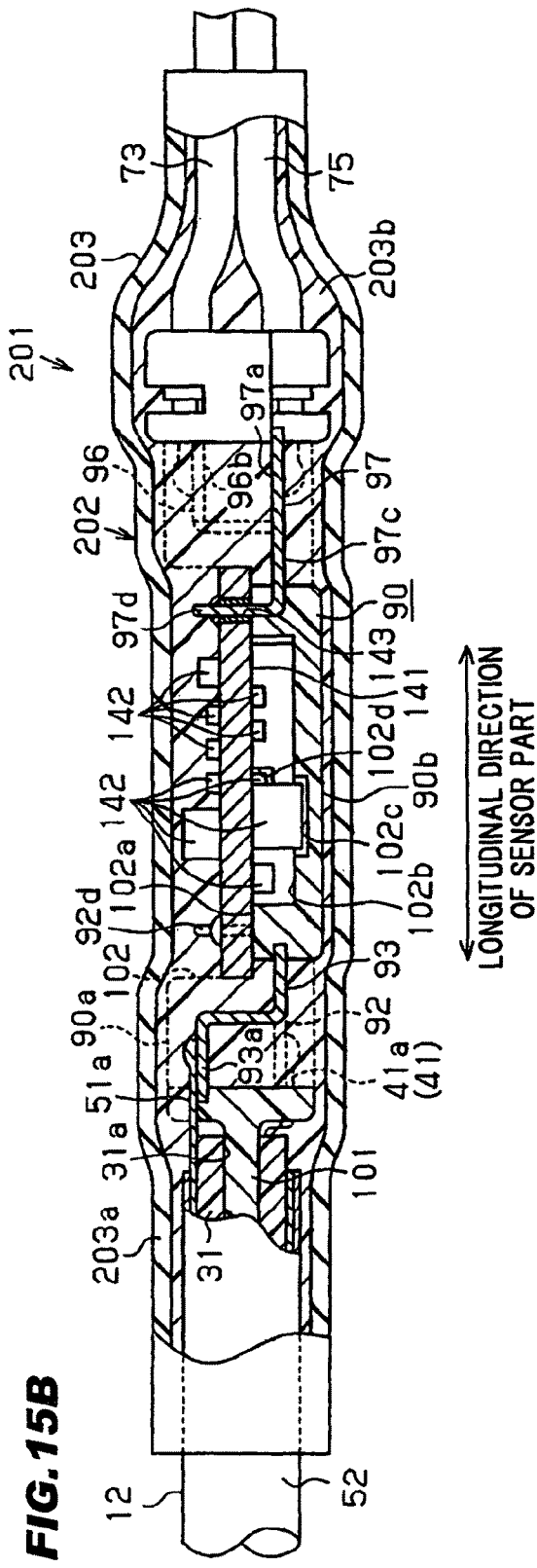

FOREIGN OBJECT DETECTION SENSOR AND METHOD FOR MANUFACTURING THE SAME

The present application is based on Japanese Patent Application No. 2009-047199 filed on Feb. 27, 2009, the entire contents of which are incorporated herein by reference.

BACKGROUND OF THE INVENTION

1. Field of the Invention

The present invention relates to a foreign object detection sensor and a method for manufacturing the same, more particularly, to a foreign object detection sensor having a proximity detecting function for detecting whether there is a foreign object in the proximity of a sensor part and a contact detecting function for detecting a contact of foreign object to the sensor part, and a method for manufacturing the foreign object detection sensor.

2. Related Art

As conventional electric sliding door apparatuses for moving and sliding a door panel (movable body) by electrical operation using the drive force of a motor or the like, there are some electric sliding door apparatuses comprising a foreign object detection sensor for detecting a foreign object existing between a peripheral portion of a door opening for passengers and the door panel, so as to prevent insertion of the foreign object between the peripheral portion of the door opening for passengers and the door panel. By way of example only, Japanese Patent Laid-Open No. 11-237289 (JP-A 11-237289) discloses a foreign object detection sensor having a contact detecting function for detecting a foreign object by contacting the foreign object existing between a peripheral portion of a door opening for passengers and a door panel. This foreign object detection sensor as described in JP-A 11-237289 comprises a lengthy sensor part disposed along a front end portion of the door panel, and a pair of electrode wires extending spirally and provided within the sensor part. In addition, a sensor terminal is provided at a lower end portion of the sensor part. The pair of electrode wires are electrically conducted to each other at the sensor terminal via a resistor, and electrically connected to a feeding line (leading wire) connected to a power source via a conductive piece. In such a foreign object detection sensor, electric current flows from one electrode wire to another electrode wire in a normal state where the foreign object does not contact with the sensor part. When the foreign object contacts the sensor part, the sensor part is deformed, so that the pair of electrodes are short-circuited to each other by the contact to the foreign object. As a result, the electric current flows from the one electrode wire to another electrode wire without passing through the resistor, so that an voltage between the pair of electrode wires is increased compared with the normal state. The contact of the foreign object to the sensor part is detected based on variation in voltage.

As the conventional foreign object detection sensors, a foreign object detection sensor having a proximity detecting function for detecting a conductive foreign object in the proximity of a front end portion of a door panel in a non-contact manner in addition to a pressure-sensitive detecting function has been known, as described in Japanese Patent Laid-Open No. 2007-123202 (JP-A 2007-123202). A sensor part of this foreign object detection sensor comprises a pair of electrode wires and a cylindrical detecting electrode provided at an outer periphery of the pair of electrode wires, in which the detecting electrode is connected to a feeding line (leading wire) connected to a power source at a sensor terminal provided at a lower end portion of the sensor part. Such a foreign object detection sensor detects the contact of the foreign object to the sensor part in a similar manner to that of the foreign object detection sensor described in JP-A 11-237289, and detects the proximity of the foreign object to the sensor part based on variation in an electrostatic capacitance between the conductive foreign object in proximity of the sensor part and the detecting electrode.

However, in the foreign object detection sensor having the contact detecting function and the proximity detecting function as described in JP-A 2007-123202, since the electric current is supplied to the detecting electrode as well as the electrode wires, the number of conductive pieces provided at the sensor terminal for the electrical connection with the feeding line. As a result, there is a disadvantage in that wiring structure at the sensor terminal is complicated, which makes interconnection works troublesome.

SUMMARY OF THE INVENTION

An objective of the present invention is to provide a foreign object detection sensor and a method for manufacturing the same, by which the wiring structure at the sensor terminal can be simplified.

According to a feature of the present invention, a foreign objection detection sensor comprises:

a lengthy sensor part comprising a sensor electrode comprising a first sensor electrode which detects a proximity of a foreign object and a second sensor electrode which detects a contact of the foreign object;

a sensor terminal part provided at one end of the sensor part;

a leading wire pulled out from the sensor terminal part, the leading wire being electrically connected to the sensor electrode at the sensor terminal part to provide a proximity detecting function for detecting the proximity of the foreign object to the sensor part and a contact detecting function for detecting the contact of the foreign object to the sensor part, wherein the sensor terminal part comprises a support member which supports a detection circuit unit electrically connected to the sensor electrode to carry out the proximity detecting function and the contact detecting function together with the sensor electrode, wherein the detection circuit unit is disposed in the support member.

According to this feature, the detection circuit unit is supported by the supporting member. Therefore, the position of the detection circuit unit is stabilized by being supported by the supporting member, so that it is possible to electrically connect the detection circuit unit to the sensor electrode with ease. In addition, the sensor terminal is provided at the one end of the sensor part in the longitudinal direction. By arranging the detection circuit unit in the supporting member constituting the sensor terminal, it is possible to shorten a wiring for electrically connecting between the sensor electrode and the detection circuit unit. Therefore, the wiring in the sensor terminal can be simplified. In addition, by shortening the wiring for electrically connecting the sensor electrode to the detection circuit unit, it is possible to suppress the influence of the disturbance by an external factor on the electrical signal output from the first sensor electrode for detecting the proximity of the foreign object between the sensor part and the detecting circuit unit.

In the foreign object detection sensor, the support member may comprise terminals which electrically connect at least one of the leading wire and the sensor electrode to the detection circuit unit, and a base part which holds the terminals.

According to this feature, at least one of the sensor electrode and the leading wire are electrically connected to the detection circuit unit via the terminals, so that the connection between at least one of the sensor electrode and the leading wire to the detection circuit unit can be stabilized. In addition, a rigidity of the supporting member is increased by the terminals, so that the detection circuit unit can be supported by the supporting member more stably.

In the foreign object detecting sensor, the detection circuit unit may comprise a circuit board comprising board-side connecting parts to which the terminals are electrically connected, and electric parts mounted on the circuit board and configured to carry out the proximity detecting function and the contact detecting function, in which the terminals comprise terminal-side connecting parts to be electrically connected to the board-side connecting parts, respectively, in which the base part comprises a board mounting part on which the circuit board is mounted, in which the board mounting part holds the terminals such that the terminal-side connecting parts provided in the board mounting part are disposed in positions corresponding to the board-side connecting parts.

According to this feature, in the board mounting part, the terminal-side connecting parts provided in the supporting member are disposed in positions corresponding to the board-side connecting parts provided in the circuit board. Therefore, in accordance with the arrangement of the circuit board on the board mounting part, it is possible to engage the terminal-side connecting parts with the board-side connecting parts respectively such that the terminal-side connecting parts and the board-side connecting parts are provided to be connectable with each other. Therefore, a configuration for connecting the terminals to the detection circuit unit is simplified, and it is possible to electrically connect the terminals to the detection circuit unit more easily.

In the foreign object detecting sensor, a sensor electrode may be electrically connected to the terminal by connecting a connecting line provided at an end part provided on a side of the sensor terminal in the sensor electrode to the terminals having a higher rigidity than a rigidity of the connecting line by welding, each of the board-side connecting parts comprises a through-hole, each of the terminal-side connecting parts comprises a pin-shape to be inserted to the through hole, and the terminal-side connecting parts respectively inserted into the board-side connecting parts are electrically connected to the circuit board via the board-side connecting parts by soldering.

According to this feature, the connecting line provided at the end part of the sensor electrode is connected to the terminals by the welding with high bonding property, so that the connecting line is strongly and securely connected to the terminals. In addition, since the rigidity of the terminals is higher than the rigidity of the connecting line, it is possible to suppress the external force applied to the sensor part to act on the circuit board through the terminals. Further, even if the terminal-side connecting parts and the board-side connecting parts are bonded to each other by soldering, it is possible to obtain a reliability of the bonding part, since the external force applied to the sensor part is suppressed to act on the circuit board by means of the terminals having the rigidity higher than that of the connecting line. Accordingly, even if the connecting line is not directly bonded with the circuit board by welding, it is possible to realize a structure that is strong against the external force applied to the sensor part. Further, since the welding is not directly carried out in the circuit board, it is possible to suppress defectives due to welding heat, for example, the electric parts mounted on the circuit board are damaged by welding heat generated at the time of welding. In addition, since the board-side connecting part comprises the through-hole and the terminal-side connecting parts comprise the pin-shape, it is possible to easily connect the board-side connecting parts with the terminal-side connecting parts.

In the foreign object detecting sensor, the board mounting part may be formed as a recess by concaving a side face of the base part, an arrangement recess for accommodating the electric parts is formed as a recess at a bottom plate of the board mounting part, the detection circuit unit is disposed on the bottom plate of the board mounting part to abut the bottom plate, and the electric parts mounted on a side of the bottom plate of the board mounting part in the circuit board is disposed in the arrangement recess.

According to this feature, since the circuit board is disposed on the bottom plate of the board mounting part to abut the bottom plate, the detection circuit unit is supported by the supporting member. Further, since the board mounting part is formed as a recess by concaving the side face of the base part, the detection circuit unit is disposed at an area close to the inside of the base part. Therefore, it is possible to protect the detection circuit unit by the base part more easily. Furthermore, the electric parts mounted on the side of the bottom plate in the circuit board are protected by the base part from the outside, since the electric parts are disposed in the arrangement recess.

In the foreign object detecting sensor, the base part may comprise an electric part-accommodating part for accommodating the electric parts protruding in the thickness direction of the circuit board toward the side of the base part.

According to this feature, some of the electric parts protruding in the thickness direction of the circuit board toward to the side of the base part are accommodated in the electric part-accommodating part, so that it is possible to shorten the distance between the circuit board and the base part, thereby suppressing the increase in dimension in the thickness direction of the circuit board in the sensor terminal.

In the foreign object detecting sensor, each of the terminals may comprise a terminal end to which either the sensor electrode or the leading wire is connected, and adjacent terminal ends are adjacently provided in a direction perpendicular to a longitudinal direction of the sensor part.

According to this feature, it is possible to suppress the increase in dimension of the sensor terminal in the longitudinal direction of the sensor part. In addition, compared with a case where the terminal ends are disposed in the longitudinal direction of the sensor part, it is possible to avoid the arrangement of the terminal end that is distant from the end part on the side of the sensor terminal in the sensor electrode, so that it is possible to suppress the increase in length of the wiring between the sensor electrode and the terminal ends.

In the foreign object detecting sensor, each of the terminals may comprise a circuit board to which the terminals are electrically connected, each of the terminals comprising a terminal end to which either the sensor electrode or the leading wire is connected, in which adjacent terminal ends are arranged to have level differences therebetween in a thickness direction of the circuit board.

According to this feature, compared with a case where the adjacent terminal ends do not have the level differences in the thickness direction of the circuit board, it is possible to set a width in the adjacent arrangement direction of the terminal ends as a larger value. In addition, while the number of the terminal ends is increased since the number of the sensor electrodes is increased so as to provide the proximity detecting function as well as pressure-sensitive detecting function, it is possible to suppress reduction in size of the terminal end. Therefore, it is possible to electrically connect the sensor electrode and the leading wires to the terminal ends more easily. Further, the adjacent terminal ends have the level differences therebetween in the thickness direction of the circuit board, thereby suppressing the short-circuit between the terminal ends adjacent to each other.

In the foreign object detecting sensor, one of the terminals may be disposed to extend along a longitudinal direction of the sensor part with respect to the base part, and one of the leading wires and the second sensor electrode are electrically connected to both end parts of the one of the terminals respectively.

According to this feature, since the one of the leading wires and the second sensor electrode are directly short-circuited by one terminal. When the electrical signal output from the second sensor electrode is directly output from the leading wire to the outside of the sensor terminal, it is not necessary to connect the second sensor electrode to the circuit board. As in the invention, when the second sensor electrode and the one leading wire are directly short-circuited by the terminal, it is no longer necessary to provide a junction for electrically connecting the second sensor electrode to the leading wire. As a result, downsizing of the circuit board can be expected. Still further, the terminal which short-circuits the second sensor electrode and the leading wire is arranged to extend along the longitudinal direction of the sensor part with respect to the base part, so that the rigidity of the supporting member is increased by the first terminal.

In the foreign object detecting sensor, each of the terminals may be partially embedded in the base part.

In the foreign object detecting sensor, the terminals may comprise a pair of terminals provided at a side surface of the support member and connected to each other by a connecting part, and the connecting part may be partially embedded in the base part.

According to this feature, since the terminals are partially embedded in the base part, so that the positions thereof in the supporting member are easily stabilized. Therefore, the short-circuit between the terminals can be suppressed. In addition, the rigidity of the supporting member is further increased by partially embedding the terminals in the base part.

In the foreign object detecting sensor, the sensor terminal may comprise a cover to be assembled with the base part to cover the detection circuit unit.

According to this feature, components (parts) composing the detection circuit unit are protected by means of the cover against damages such as impact from the outside.

In the foreign object detecting sensor, the cover may comprise a material same as a material of the base part.

According to this feature, since the base part and the cover are made from the same material, it is possible to reduce fabrication cost. Further, it is possible to simultaneously form the base part and the cover.

In the foreign object detecting sensor, the sensor part may comprises a restorative hollow insulative member, the second sensor electrode comprises a plurality of sensor electrodes that are provided inside of the hollow insulative member along a longitudinal direction of the hollow insulative member while keeping an electrically non-contact state with each other, and the first sensor electrode is provided at an outer periphery surface of the hollow insulative member to provide an electrostatic capacitance between the second sensor electrode and the first sensor electrode and to provide a floating capacitance between the second sensor electrode and a conductive foreign object in a proximity of the sensor part.

According to this feature, electrical connection of a plurality of the first sensor electrodes and a plurality of the second sensor electrode to the detection circuit unit can be easily carried out, by electrically connecting the plurality of the first sensor electrodes to the second sensor electrode at a sensor terminal.

In the foreign object detecting sensor, the supporting member may comprise terminals which electrically connect at least one of the leading wire and the sensor electrode to the detection circuit unit, each of the terminals comprising a terminal end to which either the sensor electrode or the leading wire is connected, adjacent terminal ends being adjacently provided in a direction perpendicular to a longitudinal direction of the sensor part, in which one of the terminal ends to which the second sensor electrode is connected is disposed on an extended line of a central axis along a longitudinal direction of the hollow insulative member when viewed from a direction that is perpendicular to an adjacent arrangement direction of the terminal ends and perpendicular to the longitudinal direction of the hollow insulative member.

According to this feature, it is possible to shorten the distance between the second sensor electrode and the terminal end to which the second sensor electrode is connected, thereby shortening the wiring between the second sensor electrode and the terminal end. In addition, since the wiring between the second sensor electrode and the terminal end is shortened, it is possible to suppress the short-circuit between the second sensor electrode and the first sensor electrode in the sensor terminal.

In the foreign object detecting sensor, the supporting member, the detection circuit unit, an end part of the sensor part on a side of the supporting member, and an end part of the leading wire on the side of the supporting member are coated with a jacket member.

According to this feature, ingress of liquid into the sensor terminal can be prevented by the jacket member.

In the foreign object detecting sensor, the supporting member comprises a sensor attaching part to be engaged with the sensor part at one end of the sensor part in a longitudinal direction of the sensor part such that the supporting member is attached to the one end of the sensor part.

According to this feature, the supporting member can be attached to the sensor part easily by engaging the sensor attaching part with the one end of the sensor part. In addition, since it is not necessary to use extra parts to attach the sensor terminal at the one end in the longitudinal direction of the sensor part, it is possible to suppress the increase in the number of parts and to easily carry out the attachment of the sensor terminal.

According to another feature of the invention, a method for manufacturing a foreign objection detection sensor comprising a lengthy sensor part comprising a sensor electrode comprising a first sensor electrode which detects a proximity of a foreign object and a second sensor electrode which detects a contact of the foreign object, a leading wire pulled out from a sensor terminal part provided at one end of the sensor part, the leading wire being electrically connected to the sensor electrode at the sensor terminal part to provide a proximity detecting function for detecting the proximity of the foreign object to the sensor part and a contact detecting function for detecting the contact of the foreign object to the sensor part, the method comprising:

an arrangement step of arranging a detection circuit unit electrically connected to the sensor electrode to carry out the proximity detecting function and the contact detecting function together with the sensor electrode on a support member which constitutes the sensor terminal part; and a connection step of electrically connecting the detection circuit unit to the sensor electrode in a state where the detection circuit unit is supported by the supporting member.

According to this feature, the electrical connection of the detection circuit unit with the sensor electrode is carried out, in a state where the detection circuit unit is supported by the supporting member constituting the sensor part, namely, the position of the detection circuit unit is stabilized by the support of the supporting member. Therefore, it is possible to easily carry out the electrical connection of the detection circuit unit with the sensor electrode. In addition, since the sensor terminal is provided at the one end of the sensor part, it is possible to shorten a wiring for electrically connecting between the sensor electrode and the detection circuit unit by arranging the detection circuit unit in the supporting member constituting the sensor terminal. Therefore, the wiring in the sensor terminal can be simplified.

The method for manufacturing a foreign object detecting sensor may further comprise a support member forming step of forming the support member by holding terminals which electrically connect at least one of the leading wire and the sensor electrode to the detection circuit unit in a base part, in which the at least one of the leading wire and the sensor electrode is electrically connected to the detection circuit unit by the terminals.

According to this feature, the supporting member is formed by holding the terminals in the base part, the detection circuit unit can be supported by the supporting member more stably, since a rigidity of the supporting member is increased by the terminals. In the connection step, at least one of the sensor electrode and the leading wire are electrically connected to the detection circuit unit via the terminals, so that the connection between at least one of the sensor electrode and the leading wire to the detection circuit unit can be stabilized.

In the method for manufacturing a foreign object detecting sensor, the detection circuit unit may comprise a circuit board comprising board-side connecting parts to which the terminals are electrically connected, and electric parts mounted on the circuit board and configured to carry out the proximity detecting function and the contact detecting function, in which the terminal-side connecting parts provided in the terminals are engaged with the board-side connecting parts respectively in accordance with the arrangement of the circuit board on the board mounting part provided in the base part in the arrangement step.

According to this feature, it is possible to engage the terminal-side connecting parts with the board-side connecting parts respectively in accordance with the arrangement of the circuit board on the board mounting part in the arrangement step, so that it is possible to electrically connect the terminals to the detection circuit unit more easily.

In the method for manufacturing a foreign object detecting sensor, the terminal-side connecting parts having a pin-shape may be inserted into the board-side connecting parts having a through-hole shape respectively in accordance with the arrangement of the circuit board on the board mounting part, the connection step may comprise a connecting part connection step of electrically connecting the terminal-side connecting parts to the circuit board via the board-side connecting parts respectively by soldering, and a terminal part connection step of electrically connecting the sensor electrode to the terminals by connecting a connecting line provided at an end part provided on a side of the sensor terminal in the sensor electrode to the terminals having a higher rigidity than a rigidity of the connecting line by welding.

According to this feature, the connecting line provided at the end part of the sensor electrode is connected to the terminals by the welding with high bonding property, so that the connecting line is strongly and securely connected to the terminals. In addition, since the rigidity of the terminals is higher than the rigidity of the connecting line, it is possible to suppress the external force applied to the sensor part to act on the circuit board through the terminals. Further, even if the terminal-side connecting parts and the board-side connecting parts are bonded to each other by soldering, it is possible to obtain a reliability of the bonding part, since the external force applied to the sensor part is suppressed to act on the circuit board by means of the terminals having the rigidity higher than that of the connecting line. Accordingly, even if the connecting line is not directly bonded with the circuit board by welding, it is possible to realize a structure that is strong against the external force applied to the sensor part. Further, since the welding is not directly carried out in the circuit board, it is possible to suppress defectives due to welding heat, for example, the electric parts mounted on the circuit board are damaged by welding heat generated at the time of welding. In addition, since the board-side connecting part comprises the through-hole and the terminal-side connecting parts comprise the pin-shape, it is possible to easily connect the board-side connecting parts with the terminal-side connecting parts.

In the method for manufacturing a foreign object detecting sensor, in the arrangement step, the circuit board is arranged on the board mounting part such that at least a part of the electric parts protruding in the thickness direction of the circuit board toward the side of the base part is accommodated in an electric part-accommodating part provided in the base part.

According to this feature, at least a part of the electric parts protruding in the thickness direction of the circuit board toward to the side of the base part are accommodated in the electric part-accommodating part, so that it is possible to shorten the distance between the circuit board and the base part, thereby suppressing the increase in dimension in the thickness direction of the circuit board in the sensor terminal In the method for manufacturing a foreign object detecting sensor, in the supporting member forming step, the terminals are held by the base part such that adjacent terminal ends are adjacently provided in a direction perpendicular to a longitudinal direction of the sensor part, and in the connection step, either the sensor electrode or the leading wire is connected to a terminal end of each of the terminals.

According to this feature, it is possible to suppress the increase in dimension of the sensor terminal in the longitudinal direction of the sensor part, since the terminals are held by the base part such that adjacent terminal ends are adjacently provided in the direction perpendicular to the longitudinal direction of the sensor part in the supporting member forming step. In addition, compared with a case where the terminal ends are disposed in the longitudinal direction of the sensor part, it is possible to avoid the arrangement of the terminal end that is distant from the end part on the side of the sensor terminal in the sensor electrode, so that it is possible to suppress the increase in length of the wiring between the sensor electrode and the terminal ends.

In the method for manufacturing a foreign object detecting sensor, the detection circuit unit may comprise a circuit board to which the terminals are electrically connected, and electric parts mounted on the circuit board and configured to carry out the proximity detecting function and the contact detecting function, in the supporting member forming step, the terminals are held by the base part such that adjacent terminal ends provided in the terminals have a level difference therebetween in a thickness direction of the circuit board, and in the connection step, either the sensor electrode or the leading wire is connected to a terminal end of each of the terminals.

According to this feature, compared with a case where the adjacent terminal ends do not have the level differences in the thickness direction of the circuit board, it is possible to set a width in the adjacent arrangement direction of the terminal ends as a larger value. In addition, while the number of the terminal ends is increased since the number of the sensor electrodes is increased so as to provide the proximity detecting function as well as pressure-sensitive detecting function, it is possible to suppress reduction in size of the terminal end. Therefore, it is possible to electrically connect the sensor electrode and the leading wires to the terminal ends in the connection step more easily. Further, the adjacent terminal ends have the level differences therebetween in the thickness direction of the circuit board, thereby suppressing the short-circuit between the terminal ends adjacent to each other.

In the method for manufacturing a foreign object detecting sensor, in the support member forming step, each of the terminals is partially formed in the base part by insert-molding.

According to this feature, since the terminals are partially formed in the base part by insert-molding, so that the positions thereof in the supporting member are easily stabilized. Therefore, the short-circuit between the terminals can be suppressed. In addition, the rigidity of the supporting member is further increased by partially forming the terminals in the base part by the insert-molding.

The method for manufacturing a foreign object detecting sensor may further comprises a cover assembling step of assembling a cover comprising a material same as a material of the base part with the base part to cover the detection circuit unit.

According to this feature, since the base part and the cover are made from the same material, it is possible to reduce fabrication cost. Further, components (parts) composing the detection circuit unit are protected by means of the cover against damages such as impact from the outside.

In the method for manufacturing a foreign object detecting sensor, in the supporting member forming step, the base part and the cover are formed by integral molding, and the method further comprises a separation step of separating the base part and the cover by cutting after the supporting member forming step.

According to this feature, since the base part and the cover are simultaneously formed by integral molding, it is possible to improve the productivity.

In the method for manufacturing a foreign object detecting sensor, the sensor part may comprises a restorative hollow insulative member, the first sensor electrode comprises a plurality of sensor electrodes that are provided inside of the hollow insulative member along a longitudinal direction of the hollow insulative member while keeping an electrically non-contact state with each other, and the second sensor electrode is provided at an outer periphery surface of the hollow insulative member, and in the supporting member forming step, the terminals are held by the supporting member such that adjacent terminal ends of each of the terminals are adjacently provided in a direction perpendicular to a longitudinal direction of the sensor part, in which one of the terminal ends to which the second sensor electrode is connected is disposed on an extended line of a central axis along a longitudinal direction of the hollow insulative member when viewed from a direction that is perpendicular to an adjacent arrangement direction of the terminal ends and perpendicular to the longitudinal direction of the hollow insulative member, and in the connection step, the second sensor electrode is connected to the terminal end disposed on the extended line of the central axis along the longitudinal direction of the hollow insulative member.

According to this feature, the second sensor electrode is connected to the terminal end disposed on the extended line of the central axis along the longitudinal direction of the hollow insulative member. Therefore, it is possible to shorten the distance between the second sensor electrode and the terminal end to which the second sensor electrode is connected, thereby shortening the wiring between the second sensor electrode and the terminal end. In addition, since the wiring between the second sensor electrode and the terminal end is shortened, it is possible to suppress the short-circuit between the second sensor electrode and the first sensor electrode in the sensor terminal.

The method for manufacturing a foreign object detecting sensor may further comprises a coating step by coating the supporting member, the detection circuit unit, an end part of the sensor part on a side of the supporting member, and an end part of the leading wire on the side of the supporting member with a jacket member having no water permeability after the connection step.

According to this feature, ingress of liquid into the sensor terminal can be prevented by the jacket member, by coating the supporting member, the detection circuit unit, the end part of the sensor part on a side of the supporting member, and the end part of the leading wire on the side of the supporting member with the jacket member having no water permeability.

ADVANTAGES OF THE INVENTION

According to the present invention, it is possible to provide a foreign object detection sensor and a method for manufacturing the same, by which the wiring structure at the sensor terminal can be simplified.

BRIEF DESCRIPTION OF THE DRAWINGS

Next, the mobile communication base station antenna in embodiments according to the invention will be explained in conjunction with appended drawings, wherein:

FIG. 4A is a cross-sectional view showing the vicinity of a front end portion of a door panel provided in the vehicle of FIG. 1, and FIG. 4B is a cross-sectional view showing a sensor part attached to the door panel shown in FIG. 4A;

FIG. 5 is a front view showing the end part of a sensor terminal-side in the sensor part;

FIGS. 6A to 6C are cross-sectional view showing the sensor terminal in the first embodiment;

FIG. 8A is a plan view showing the terminal, FIG. 8B is a side view showing the terminal, and FIG. 8C is a cross-sectional view showing the terminal (cut along B-B line in FIG. 8A);

FIG. 13A is a plan view showing a material for the terminal before bending, and FIG. 13B is a plan view showing the material for the terminal after bending;

FIGS. 15A and 15B are cross sectional view showing a foreign object detection sensor in the second embodiment.

DETAILED DESCRIPTION OF THE EMBODIMENTS

First Embodiment

Next, the embodiments according to the present invention will be explained below in more detail in conjunction with appended drawings.

In the following, the first embodiment according to the present invention is described in reference to the drawings.

Figure 1:
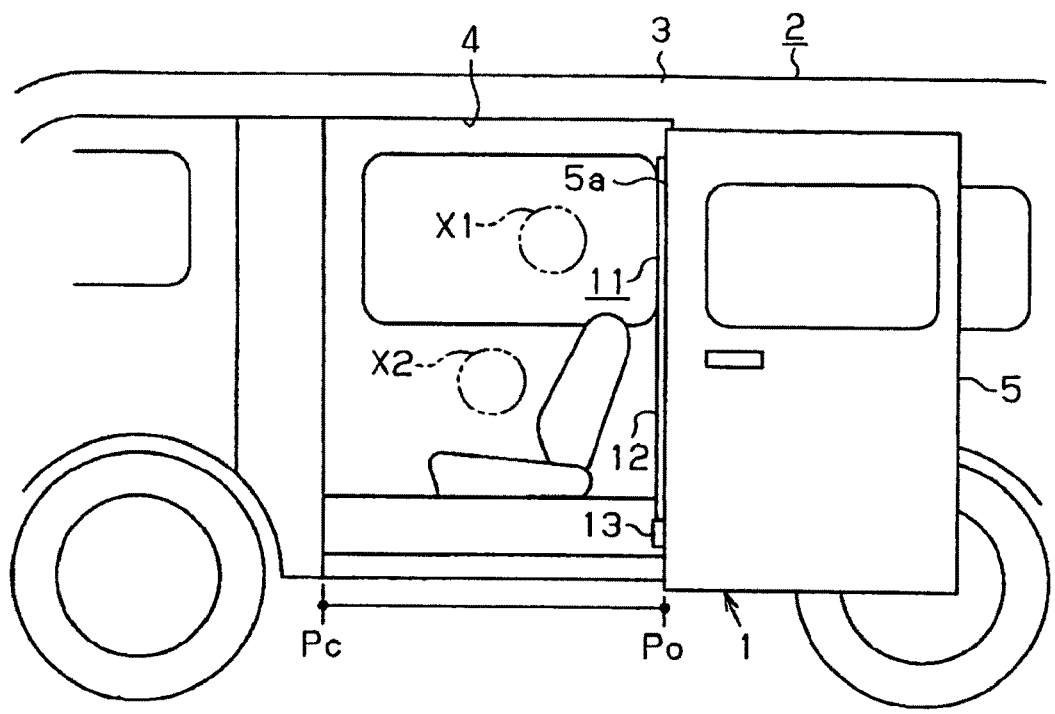
FIG. 1 is a perspective view showing a vehicle provided with an electric sliding door apparatus according to one embodiment of the present invention.

FIG. 1 is a perspective view showing a vehicle 2 provided with an electric sliding door apparatus 1 according to the first embodiment of the present invention.

FIG. 1 shows a vehicle 2, on which an electric sliding door apparatus 1 is mounted. As shown in FIG. 1, the vehicle 2 is provided with a vehicle body 3 comprising a conductive metal material, and a door opening 4 for passengers which is provided on a left side of the vehicle body 3 as a rectangular opening. The door opening 4 is opened and closed with a door panel 5 comprising a conductive metal material and having a rectangular shape corresponding to a shape of the door opening 4.

As shown in FIG. 1, the door panel 5 is attached to the vehicle body 3 in such a manner as to be moveable substantially in a front-rear direction of the vehicle 2. A driving mechanism (not shown) is provided with a slide actuator 6 (shown in FIG. 2) and installed on a side of the vehicle body 3 that is connected to the door panel 5. When the slide actuator 6 is driven, the door panel 5 is slidably moved in the front-rear direction of the vehicle 2 to open and close the door opening 4.

Figure 2:
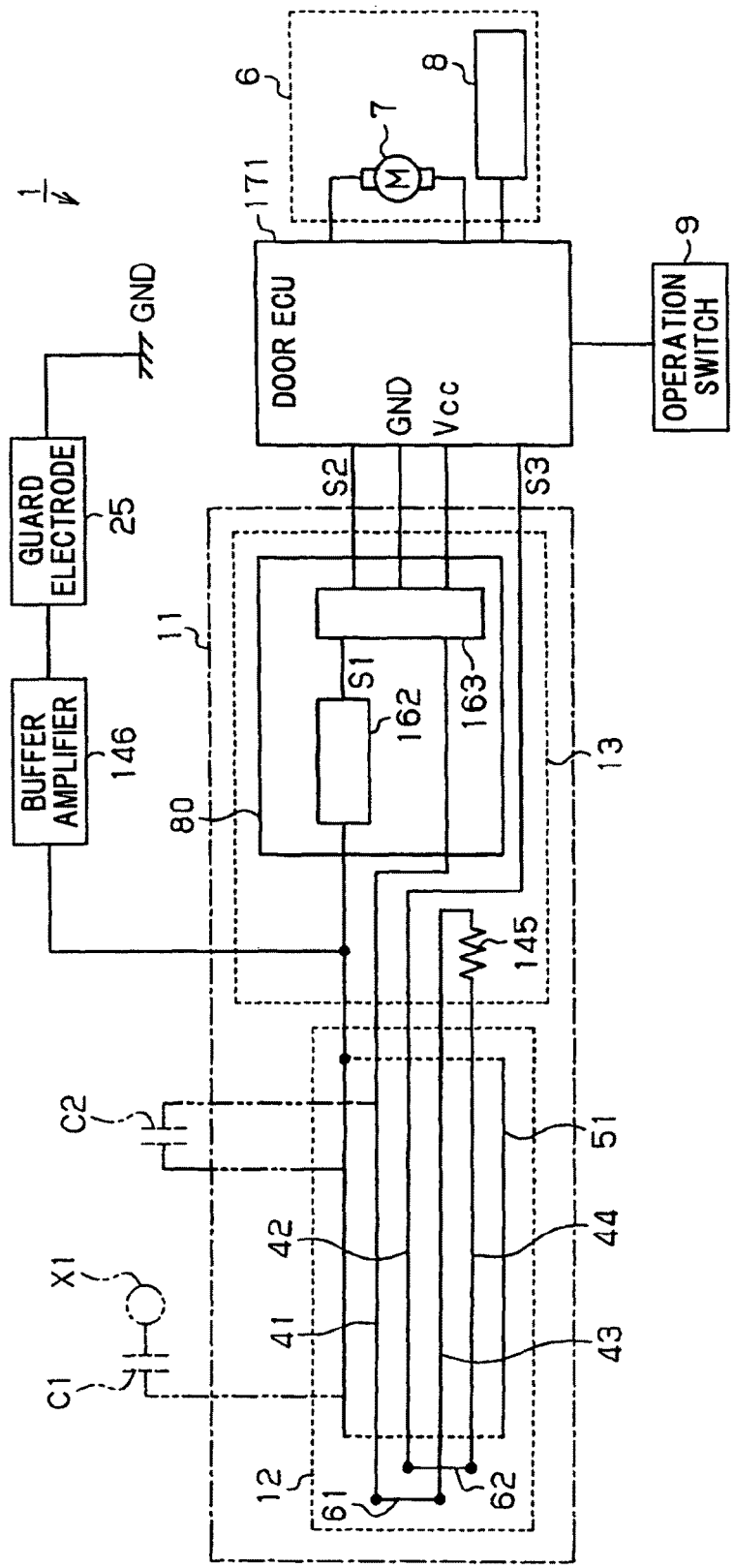
FIG. 2 is a block diagram showing electrical configuration of an electric sliding door apparatus of FIG. 1.

FIG. 2 is a block diagram showing the electrical configuration of the electric sliding door apparatus 1 of FIG. 1.

As shown in FIG. 2, the slide actuator 6 is provided with a slide motor 7 and a reduction gear mechanism (not shown) for reducing a speed of rotation of the slide motor 7. A position detecting device 8, which is a position detecting section for detecting the rotation of the slide motor 7, is provided within the slide actuator 6. The position detecting device 6 is provided with, for example, a permanent magnet (not shown) which rotates together with a rotary shaft (not shown) of the slide motor 7 or reduction gears (not shown) which form the reduction gear mechanism, and a Hall IC (not shown) placed so as to face the permanent magnet. The position detecting device 6 outputs a pulse signal in accordance with change in magnetic field of the permanent magnet caused by to rotation of the permanent magnet as a position detection signal.

The electric sliding door apparatus 1 is provided with an operation switch 9 for ordering opening and closing operation of the door panel 5. When this operation switch 9 is operated by a passenger in the vehicle 2 so that the door opening 4 is opened, the operation switch 9 outputs an opening signal so that the door panel 5 slides and the door opening 4 opens. Meanwhile, when the operation switch 9 is operated by the passenger so that the door opening 4 closes, the operation switch 9 outputs a closing signal so that the door panel 5 slides and the door opening 4 closes. This operation switch 9 is provided in a predetermined portion (dashboard or the like) within the passenger compartment, on a side of the door panel 5 inside the passenger compartment, a portable item (not shown) carried together with an ignition key or the like.

Further, as shown in FIG. 1, the electric sliding door apparatus 1 is provided with a foreign object detection sensor 11 for detecting a foreign object X1 having conductivity and a foreign object X2 having no conductivity between the front end portion 5a of the door panel 5 and the door opening 4. The foreign object detection sensor 41 is provided with a lengthy sensor part 12, and a sensor terminal 13 provided at one end of the sensor part 12 in a longitudinal direction.

Figure 3A:
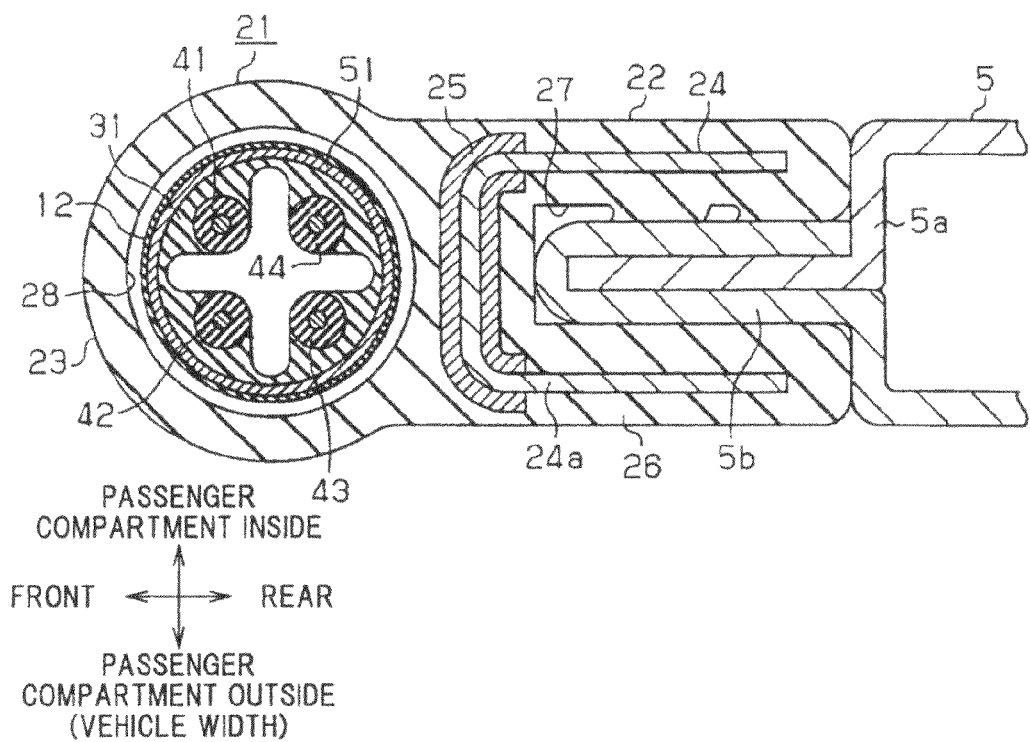

The sensor part 12 has a lengthy cable configuration provided along the front end portion 5a of the door panel 5, and is formed to have a length that is substantially equal to a length of the front end portion 5a of the door panel 5 in the up-down direction. As shown in FIG. 3A, the sensor part 12 is fixed to the front end portion 5a of the door panel 5 via a fixing member 21. The fixing member 21 comprises an attachment portion 22 for securing the fixing member 21 to the door panel 5a and a support portion 23 for holding the sensor part 12 and, which are integrated with each other.

The attachment portion 22 comprises a reinforcing member 24 comprising a conductive metal plate material, a guard electrode 25 comprising a conductive rubber, and a attachment main body 26 comprising an insulating resin material having elasticity, in which the reinforcing member 24 and the guard electrode 25 are embedded in the attachment main body 26. Herein, the insulating resin material means elastomer, rubber or the like. The attachment main body 26 in the first embodiment comprises an elastomer.

The reinforcing member 24 is formed of a great number of skeletal members 24a each having a substantially U-shaped cross section by bending, which are serially connected in the up-down direction (a vertical direction in FIG. 3A) of the vehicle 2. The guard electrode 25 is formed so as to be integrated with the reinforcing member 24 in such a manner that a part on a side opposite to a U-shaped opening of the skeletal member 24a in the reinforcing member 24 is embedded with the guard electrode 25, and the guard electrode 25 is adhered to the reinforcing member. The attachment main body 26 coats an outer periphery surface of the reinforcing member 24. A cross-section of the attachment main body 26 in a direction perpendicular to the longitudinal direction is a substantially U-shape corresponding to the cross-section of the reinforcing member 24. A length of the attachment main body 26 is substantially equal to the length of the sensor part 12 in the longitudinal direction. The attachment main body 26 has the substantially U-shaped cross-section, and comprises an attachment groove 27 in a portion of the attachment portion 22 which becomes the inside of the skeletal members 24a, so as to extend in the longitudinal direction of the attachment portion 22.

The support portion 23 in cylindrical form comprises the same insulating resin material as that of the attachment main body 26 and has the elasticity. The support portion 23 is formed so as to be integrated with the attachment portion 22, and placed on a side opposite to an opening of the attachment groove 63a. A length of the support portion 23 in an axial direction is substantially equal to the length of the sensor part 12 in the axial direction. An insertion hole 28 is formed inside the support portion 23. An inner diameter of the insertion hole 28 is slightly larger than an outer diameter of the sensor part 12, and the sensor part 12 is inserted in the insertion hole 28.

The fixing member 21 which holds the sensor part 12 is fixed to a press-fit fixing portion 5b provided at the front end portion 5a of the door panel 5, so that the fixing member 21 supports the sensor part 12 against the door panel 5. The press-fit fixing portion 5b is extensionally provided to protrude from the front end portion 5a of the door panel 5 toward a front side of the door panel 5 and to extend in the up-down direction of the vehicle 2. A length of the press-fit fixing portion 5b in the longitudinal direction (same as the up-down direction of the vehicle 2) is substantially equal to the length of the fixing member 21 in the longitudinal direction. This press-fit fixing portion 5b is press-fitted in the attachment groove 27 of the attachment portion 22, so that the fixing member 21 is fixed to the front end portion 5a of the door panel 5. In addition, the guard electrode 25 is connected to a ground GND (i.e. grounded to the vehicle body 3) via the reinforcing member 24.

Figure 3B:
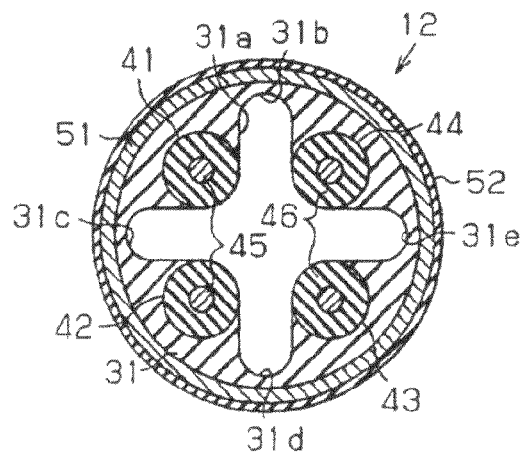

As shown in FIG. 3B, an insulating layer 31 provided in a center portion of the sensor part 12 comprises an elastically-deformable insulating material having insulating properties and elasticity, such as soft synthetic resin material or rubber. The insulating layer 31 is lengthy and substantially cylindrical. A separate hole 31a is formed in a center portion in a diameter direction of the insulating layer 31 so as to extend in the longitudinal direction of the insulating layer 31. The separate hole 31a includes four separate recesses 31b to 31e, that are provided as concaves extending outward in the diameter direction of the insulating layer 31 at four points with an equiangular interval in a circumferential direction in a cross section perpendicular to the longitudinal direction of the insulating layer 31. The recesses 31b to 31e are connected to each other in a center portion of the insulating layer 31. Therefore, the separate hole 31a is in cross form in the cross section of the insulating layer 31 perpendicular to the longitudinal direction. The hole 31a extends in the longitudinal direction of the insulating layer 31, so that the four recesses 31b to 31e are respectively in helix form.

A first electrode wire 41 to a fourth electrode wire 44 as a second sensor electrode which are held by the insulating layer 31 are placed inside the insulating layer 31. The respective electrode wires 41 to 44 are provided with a center electrode 45 which is formed by twisting conductive fine wires and has flexibility, and a coating layer 46 in cylindrical form for coating an outer periphery of the center electrode 45. The coating layer 46 has conductivity and elasticity. The respective electrode wires 41 to 44 are placed between adjacent recesses 31b to 31e, one between each two, and extend along the recesses 31b to 31e in helix form. Substantially half of the surface of each of the electrode wires 41 to 44 is buried inside the insulating layer 31 between the recesses 31b to 31e.

A detecting electrode 51 is provided as a first sensor electrode having conductivity at an outer periphery of the insulating layer 31. The detecting electrode 51 in cylindrical form coats the insulating layer 31 from one end to another end in the longitudinal direction of the insulating layer 31. For example, the detecting electrode 51 is formed of a plurality of metal wires wound around the outer periphery of the insulating layer 31 to provide a cylindrical form. As shown in FIG. 3, the outer electrode 52 is electrically connected to the above described capacitance detecting section 43. In addition, an outer periphery of the detecting electrode 51 is coated with a cylindrical insulative coating 52. The insulative coating 52 is formed of an insulative material and has a configuration of a thin film. The insulative coating 52 is elastically deformable and a length in a longitudinal direction thereof is substantially equal to the length of the insulating layer 31 in the longitudinal direction.

As shown in FIG. 4A and FIG. 4B, the first electrode wire 41 and the third electrode wire 43 are electrically connected to each other by a short-circuit wire 61 at one end (an upper end in a state of being attached to the door panel) in the longitudinal direction, and the second electrode wire 42 and the fourth electrode wire 44 are electrically connected to each other by a short-circuit wire 62 at one end in the longitudinal direction. More concretely, the center electrode 45 in the first electrode wire 41 and the center electrode 45 in the third electrode wire 43 are electrically connected to each other via the short-circuit wire 61, and the center electrode 45 in the second electrode wire 42 and the center electrode 45 in the fourth electrode wire 44 are electrically connected to each other via the short-circuit wire 62. Ends of both the short-circuit wire 61 and the short-circuit wire 62 in the sensor part 12 are molded by a mold part 63 comprising an insulative resin material.

As shown in FIG. 5, another ends of the respective electrode wires 41 to 44 (a lower end in a stated of being attached to the door panel 5) in the longitudinal direction where the short-circuit lines 61 and 62 are pulled out from the end of the insulating layer 31 to provide connecting terminal parts 41a to 44a. Furthermore, one end of the detecting electrode 51 in the longitudinal direction (an end part on a side of the connecting terminal parts 41a to 44a) is pulled to protrude with respect to the end part of the insulating layer 31 similarly to the connecting terminal parts 41a to 44a, there by forming a connecting terminal part 51a.

As shown in FIG. 6A to FIG. 6C, the sensor terminal 13 is provided at the ends of the connecting terminal parts 41a to 44 on the side of the sensor part 12. In this sensor terminal 13, the first to forth electrode wires 41 to 44 and the detecting electrode 51 and a first leading wire 71 to a fifth leading wire 75 pulled from the sensor terminal 13 are electrically connected to each other, and a sensor driving circuit 80 (cf. FIG. 2) is disposed in the sensor terminal 13. The sensor terminal 13 comprises a supporting member 81, a detection circuit unit held by a supporting member 81, and a cover 83 which covers the detection circuit unit 82.

Figure 7A:
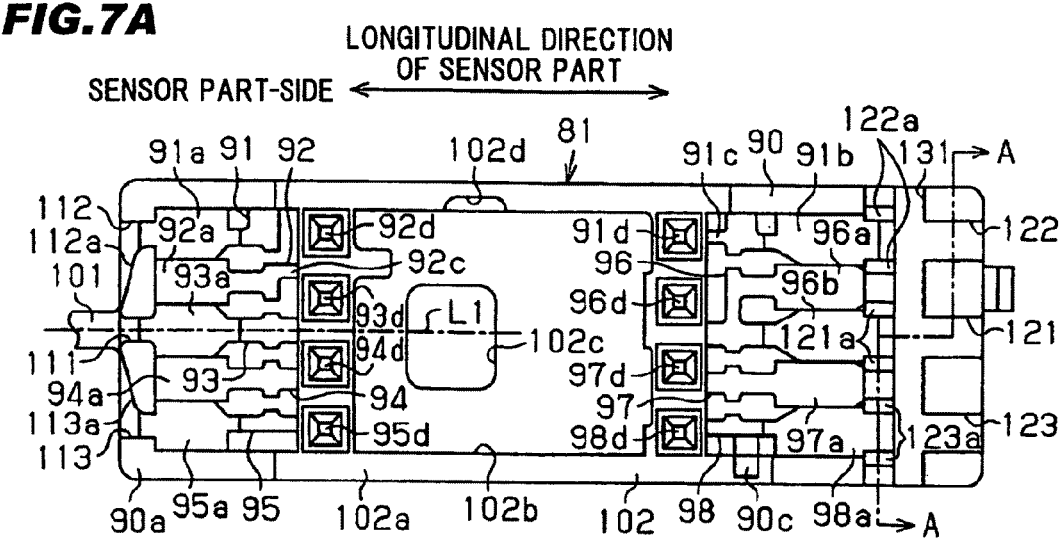
FIG. 7A is a plan view showing a supporting member.

As shown in FIG. 7A, the supporting member 81 is formed by partially embedding eight terminals (i.e., first to eight terminals 91 to 98) in a base part 90 comprising an insulative resin material.

The base part 90 has a substantially rectangular shape that is longer in the longitudinal direction of the sensor part 12 (the same direction to the axial direction of the sensor part 12). A stick-shape inserting portion 101 extending along the longitudinal direction of the base part 90 is formed to protrude at the center portion of one end face (an end face at a left side and on a side of the sensor part 12 in FIG. 7A) in the longitudinal direction of the sensor part 12. As shown in FIG. 6B, the sensor terminal 13 is attached to an end part of the sensor part 12 by inserting the inserting portion 101 into a separate hole 31a from the end part on the side of the connecting terminal parts 41a to 44a, and 51a in the sensor part 12. More concretely, the inserting portion 101 is engaged to the sensor part 12 in the longitudinal direction of the sensor part 12 by a frictional force between an inner periphery surface of the separate hole 31a and an outer periphery surface of the inserting portion 101 when the inserting portion 101 is inserted into the separate hole 31a of the insulating layer 31 constituting the sensor part 12. Thereby, the supporting member 81 is attached to one end of the sensor part 12 in the longitudinal direction of the sensor part 12, and the sensor terminal 13 is attached to the one end of the sensor part 12 in the longitudinal direction of the sensor part 12.

Figure 7B:
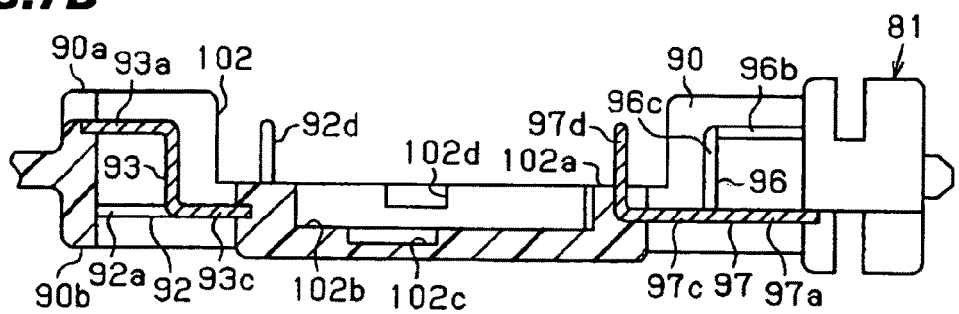
FIG. 7B is a cross-sectional view showing the supporting member.

In addition, as shown in FIG. 7A and FIG. 7B, a board mounting part 102 is formed at a center portion of a base part 90 in the longitudinal direction of the base part 90. The board mounting part 102 is concaved in a substantially rectangular shape from an attaching face 90a (i.e. an upper-side end face in FIG. 7B) at one side of the base part 90 in a thickness direction of the base part 90 to a supporting face 90b at another side of the base part 90. A depth of the board mounting part 102 is formed to be deeper than a thickness of the detection circuit unit 82 (cf. FIG. 6B).

A bottom plane of the board mounting part 102 is provide as a flat mounting face 102a, and an arrangement recess 102b having a substantially rectangular shape when viewed along a thickness direction of the base part 90 is provided as a recess at a center portion of the mounting face 102a. Furthermore, a first electric part-accommodating part 102c having a substantially rectangular shape when viewed along the thickness direction of the base part 90 is provided as a recess at a bottom plane of the arrangement recess 102b, and a second electric part-accommodating part 102d is concaved on a side of the arrangement recess 102b in the thickness direction of the base part 90 to be connected to the arrangement recess 102b.

The first to eighth terminals 91 to 98 are disposed at both sides of the board mounting part 102 in the base part 90 (i.e. both sides of the base part 90 in the longitudinal direction of the base part 90). The first to eighth terminals 91 to 98 are made of a sheet metal having electric conductivity, and rigidity thereof is higher than those of the first to fourth electrode wires 41 to 44 (including the first to fourth connecting terminal parts 41a to 44a), the detecting electrode 51 (including the connecting terminal part 51a) and the first to fifth leading wires 71 to 75.

The first terminal 91 extends over both sides of the board mounting part 102 along the longitudinal direction of the base part 90 at one end of the base part in the shorter direction (the same direction as a direction perpendicular to the longitudinal direction of the sensor part 12). The second to fifth terminals 92 to 95 supported by the base part 90 at the one end part on the side of the sensor part 12 in the longitudinal direction as well as the first terminal 91 are adjacently provided along the shorter direction of the base part 90. In addition, the sixth to eighth terminals 96 to 98 supported by the base part 90 at another end part on the opposite side of the sensor part 12 in the longitudinal direction as well as the first terminal 91 are adjacently provided along the shorter direction of the base part 90. The first to eighth terminals 91 to 98 are supported by the base part 90 so that the adjacent terminals 91 to 98 are not in contact with each other.

FIG. 8A is a plan view of the first to eighth terminals 91 to 98, and the first to eighth terminals 91 to 98 shown in FIG. 8A are disposed in the same arrangement position as a state of being supported by the base part 90. The first terminal 91 has a configuration in which two terminal ends 91a and 91b each of which has a substantially rectangular flat plate-shape are connected by a connecting part 91c having a substantially strip-shape. Both end parts in a longitudinal direction of the connecting part 91c are respectively bent in a step-like form, so that each of the two terminal ends 91a and 91b comprises steps (level differences) with respect to a center portion in the longitudinal direction of the connecting part 91c.

A pair of the terminal ends 91a and 91b provided at a side surface of the support member 81 are connected to each other by the connecting part 91c, and the connecting part 91c is partially embedded in the base part 90.

A connecting pin 91d extended toward a side of the two terminal ends 91a and 91b and then bent to be perpendicular to the connecting part 91c is formed to be integral with one end part of the connecting part 91c on the side of the terminal end 91b. In the first terminal 91, the two terminal ends 91a and 91b are disposed in a plane that is perpendicular to the connecting pin 91d, and disposed to have the same height as that of a tip portion (nose) of the connecting pin 91d (i.e. a height in a direction along which the connecting pin 91d extends).

In addition, the second to fifth terminals 92 to 95 respectively comprise terminal ends 92a to 95a each of which has a substantially rectangular flat-plate shape, connecting parts 92c to 95c each of which has a substantially strip-like shape and extends from each of the terminal ends 92a to 95a, and connecting pins 92d to 95d each of which is provided at another end opposite to the one end at which each of the terminal ends 92a to 95a is provided in each of the connecting part 92c to 95c. Each of the connecting pins 92d to 95d is bent to be perpendicular to each of the connecting parts 92c to 95c similarly to the connecting pin 91d. In the third terminal 93 which is second from the first terminal 91 and the fifth terminal 95 which is second from the third terminal 93, end parts at sides of the terminal ends 93a and 95a in the connecting parts 93c and 95c are respectively bent in a step-like form, so that each of the terminal ends 93a and 95a comprises steps (level differences) with respect to each of portions on the sides of the terminal ends 93a and 95a of the connecting parts 93c and 95c (cf. FIG. 8C). In the third and fifth terminals 93 and 95, the terminal ends 93a and 95a are disposed in a plane that is perpendicular to the connecting pins 93d and 95d, and disposed to have the same height as that of the tip portion (nose) of the connecting pin 91d (i.e. a height in a direction along which the connecting pins 93d and 95d extend). On the other hand, in the second and fourth terminals 92 and 94, the terminal ends 92a and 94a are disposed in a plane that is perpendicular to the connecting pins 92d and 94d, and disposed in the same plane as the plane in which the connecting parts 92c and 94c are disposed, namely, disposed to have the same height as that of the tip portion (nose) of the connecting pin 91d (i.e. a height in a direction along which the connecting pins 92d and 94 extend).

The sixth terminal 96 comprises two terminal ends 96a and 96b each of which has a substantially rectangular flat-plate shape and that are adjacent to each other, a connecting part 96c which extends to connect between the two terminal ends 96 and 96b, and a connecting pins 96d which is bent to be perpendicular to the connecting part 96c. The connecting part 96c is bent in a step-like form at a region in a vicinity of the terminal end 96b, so that the terminal end 96b comprises steps (level differences) with respect to the terminal end 96a that is disposed in the same plane as that a portion of the connecting part 96c on a side of the connecting pin 96d is disposed (cf. FIG. 8C). On the other hand, the terminal end 96a is disposed in a plane that is perpendicular to the connecting pin 96d on a side of a base part of the connecting pin 96d. The terminal end 96b is disposed in a plane that is perpendicular to the connecting pin 96d, and disposed to have the same height as that of a tip portion (nose) of the connecting pin 96d (i.e. a height in a direction along which the connecting pin 96d extends).

A seventh terminal 97 has a symmetrical configuration to the fourth terminal 94, and comprises a terminal end 97a which has a substantially rectangular flat-plate shape, a connecting part 97c which has a substantially strip-like shape and extends from the terminal end 97a, and a connecting pin 97d which is bent to be perpendicular to the connecting part 97c at another end opposite to one end at which the terminal end 97a is provided in the connecting part 97c. In the seventh terminal 97, the terminal end 97a is disposed in a plane that is perpendicular to the connecting pin 97d on a side of a base part of the connecting pin 97d.

An eighth terminal 98 has a symmetrical configuration to the fifth terminal 95, and comprises a terminal end 98a which has a substantially rectangular flat-plate shape, a connecting part 98c which has a substantially strip-like shape and extends from the terminal end 98a, and a connecting pin 98d which is bent to be perpendicular to the connecting part 98c at another end opposite to one end at which the terminal end 98a is provided in the connecting part 98c. In the eighth terminal 98 which is second from the sixth terminal 96, as shown in FIG. 8B, the connecting part 98c is bent on a side of the terminal end 98a in the connecting part 98c, so that the terminal end 98a comprises steps (level differences) with respect to a portion on a side of the connecting pin 98d in the connecting part 98c. The terminal end 98a is disposed in a plane that is perpendicular to the connecting pin 98d to have the same height as that of a tip portion (nose) of the connecting pin 98d (i.e. a height in a direction along which the connecting pin 98d extends).

As shown in FIG. 7A, the first to eighth terminals 91 to 98 are supported by the base part 90 by embedding respective portions in vicinity of the base parts of the connecting pins 91d to 98d in the both ends in the longitudinal direction of the board mounting part 102. Herein, in the first terminal 91, the connecting part 91c is embedded at one end in the shorter direction of the base part, and peripheral portions of the terminal ends 91a to 95a, 91b, and 96b are partially embedded in the base part 90. Further, the first to eighth the first to eighth terminals 91 to 98 are supported by the base part in a state that the adjacent terminals are separated in the shorter direction of the base part 90.

In the first to eighth terminals 91 to 98 supported by the base part 90, tip portions (noses) of the respective connecting pins 91d to 98d protrude from the mounting surface 102a of the board mounting part 102, and oriented in the same direction (a vertical direction when a sheet of FIG. 7A is disposed in a horizontal plane). In addition, four connecting pins 92d to 95d disposed at one end part in the longitudinal direction on the side of the sensor part 12 in the board mounting part 102 are arranged with an equal interval along the shorter direction of the base part 90 (i.e. the direction perpendicular to the longitudinal direction of the sensor part 12), and the four connecting pins 92d to 95d are disposed in parallel. Similarly, four connecting pins 91d and 96d to 98d disposed at another end part in the longitudinal direction on an opposite side to the sensor part 12 in the board mounting part 102 are arranged with an equal interval along the shorter direction of the base part 90, and the four connecting pins 91d and 96d to 98d are disposed in parallel.

Further, in the first to eighth terminals 91 to 98 supported by the base part 90, when viewed from the thickness direction of the base part 90, the terminal ends 91a to 98a, 91b, and 96b are adjacently provided with an equal interval by five in the shorter direction of the base part 90 (i.e. the direction perpendicular to the longitudinal direction of the sensor part 12) at the both end parts in the longitudinal direction of the base part 90. When viewed from the thickness direction of the base part 90, the terminal ends adjacent to each other in the adjacent arrangement direction among the terminal ends 91a to 98a, 91b, and 96b are disposed without any gap which may cause a distance in the shorter direction of the base part 90.

Figure 7C:
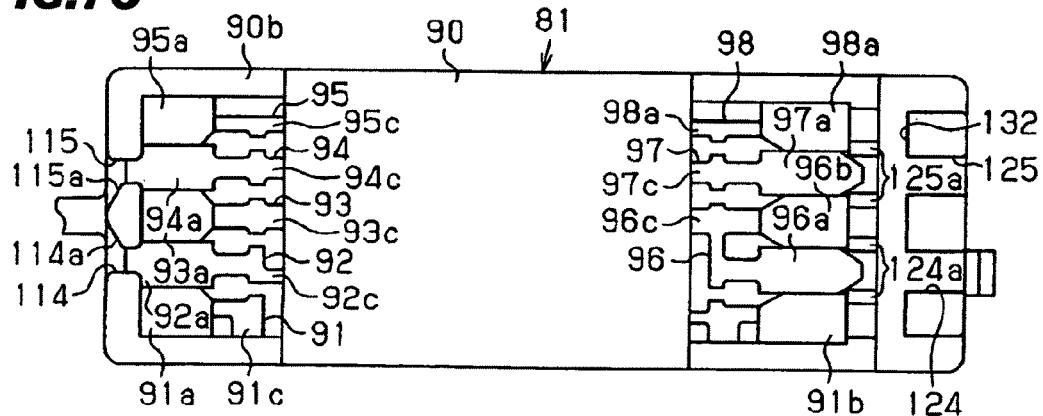
FIG. 7C is a back view showing the supporting member.
Figure 9:
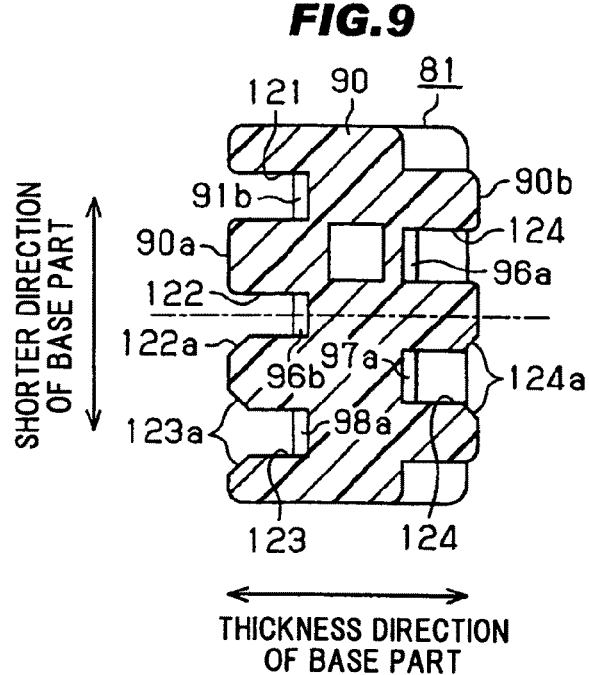
FIG. 9 is a cross-sectional view showing the supporting member (cut along A-A line in FIG. 7A)

Furthermore, as shown in FIG. 7A, FIG. 7B and FIG. 9, the terminal ends 91a to 98a, 91b, and 96b that are respectively disposed by five at the both end parts in the longitudinal direction of the base part 90 are arranged such that the terminal ends adjacent to each other in the shorter direction of the base part 90 have the level differences therebetween in the thickness direction of the base part 90. As a result the adjacent terminals in the adjacent arrangement direction are not in contact with each other. Further, the terminal ends 91a, 91b, 93a, 95a, 96b, and 98a that are six in total and disposed at sides of the tip portions (noses) of the connecting pins 91d to 98d are disposed at an equal position in the thickness direction of the base part 90 and disposed in one plane perpendicular to the connecting pins 91d to 98d. Still further, as shown in FIG. 7B, FIG. 7C and FIG. 9, the terminal ends 92a, 94a, 96a, and 97a that are four in total and disposed at sides of the base portions of the connecting pins 91d to 98d are disposed at an equal position in the thickness direction of the base part 90 and disposed in one plane perpendicular to the connecting pins 91d to 98d.

As shown in FIG. 7A, the terminal end 93a of the terminal 93 is positioned at a middle of the five terminal ends 91a to 95a provided on the side of the sensor part 12. The terminal end 93a is disposed on an extended line of a central axis line L1 along the longitudinal direction of the sensor part 12, and a center of a width direction of the terminal end 93a is disposed on the extended line of the central axis line L1, when viewed from a direction that is perpendicular to the adjacent arrangement direction of the five terminal ends 91a to 95a and perpendicular to the longitudinal direction of the sensor part 12 (i.e. the thickness direction of the base part 90). In addition, in FIG. 7A, the extended line of the central axis line L1 of the sensor part 12 is shown by a dot line.

In the attaching face 90a on a side of an opening of the arrangement recess 102b in the base part 90, three sensor-side guide grooves 111 to 113 are as recesses at one end part on a side of the sensor part 12 in the longitudinal direction. Among the three sensor-side guide grooves 111 to 113, a center sensor-side guide groove 111 is provided at a center portion in the shorter direction of the base part 90. Each of the sensor-side guide grooves 111 to 113 extends along the longitudinal direction of the base part 90 from the end part on the side of the sensor part 12 in the base part 90 toward the respective terminal ends 93a, 91a, and 95 of the terminals 93, 91, and 95. Respective inner side surfaces on a side of the center sensor-side guide groove 111 in the two sensor-side guide grooves 112 and 113 are provided as guide faces 112a and 113a that are inclined to gradually get closer to a center in the shorter direction of the base part 90 in accordance with approximation from the side of the terminal ends 91a and 95a toward the end face on the side of the sensor part 12 in the base part 90.

In the supporting face 90b on an opposite side to the opening of the arrangement recess 102b in the base part 90, two sensor-side guide grooves 114 and 115 are as recesses at one end part on the side of the sensor part 12 in the longitudinal direction. The two sensor-side guide grooves 114 and 115 are respectively formed between the three sensor-side guide grooves 111 to 113 formed on the attaching face 90a (cf. FIG. 7A), and each of the sensor-side guide grooves 114 and 115 extends along the longitudinal direction of the base part 90 from the end part on the side of the sensor part 12 in the base part 90 toward the respective terminal end 92a of the second terminal 92 and the terminal end 94 and of the fourth terminal 94. Respective inner side surfaces on a side of the center in the shorter direction of the base part 90 of the sensor-side guide grooves 114 and 115 are provided as guide faces 114a and 115a that are inclined to gradually get closer to the center in the shorter direction of the base part 90 in accordance with approximation from the side of the terminal ends 92a and 94a toward the end face on the side of the sensor part 12 in the base part 90.

As shown in FIG. 7C, at another end in the longitudinal direction on an opposite side to the sensor part 12 in the attaching face 90a, three feeding-side guide grooves 121 to 123 are provided as recesses, and a transversal groove 131 which extends along the width direction of the base part 90 to transverse the three feeding-side guide groove 121 to 123 is formed. Among the three feeding-side guide grooves 121 to 123, a center feeding-side guide groove 121 is provided at the center portion in the shorter direction of the base part 90. Each of the feeding-side guide grooves 121 to 123 extends along the longitudinal direction of the base part 90 from the end part on the opposite side to the sensor part 12 in the base part 90 toward the respective terminal ends 96b, 91b, and 98a of the sixth, first and eighth terminals 96, 91, and 98. As to the respective feeding-side guide grooves 121 to 123, in each opening at the portion on a side closer to the board mounting part 102 than the transversal groove 131, a set of inclined faces 121a, 122a, and 123a that are inclined to increase an interval with each other (an interval in the shorter direction of the base part 90) in accordance with approximation from a side of bottom parts toward openings in the respective feeding-side grooves 121 to 123.

At another end in the longitudinal direction on an opposite side to the sensor part 12 in the supporting face 90b, two feeding-side guide grooves 124 and 125 are provided as recesses, and a transversal groove 132 which extends along the width direction of the base part 90 to transverse the two feeding-side guide groove 124 and 125 is formed. The two feeding-side guide grooves 124 and 125 extends along the longitudinal direction of the base part 90 from the end part on the opposite side to the sensor part 12 in the base part 90 toward the terminal end 96a of the sixth terminal 96 and the terminal end 97a of the seventh terminal 97, respectively. As to the respective feeding-side guide grooves 124 and 125, in an each opening at the portion on a side closer to the board mounting part 102 than the transversal groove 132, a pair of inclined faces 124a and 125a that are inclined to increase an interval with each other (an interval in the shorter direction of the base part 90) in accordance with approximation from a side of bottom parts toward openings in the respective feeding-side grooves 124 and 125.

Figure 10:
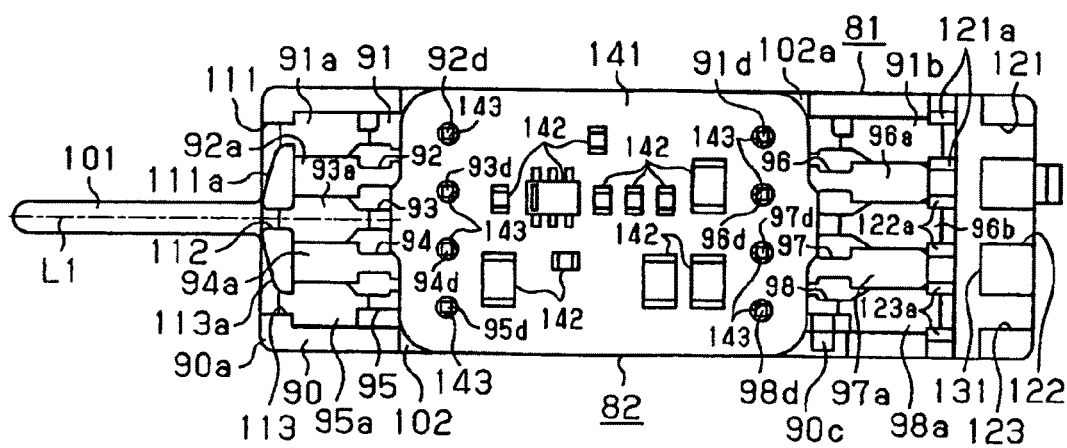
FIG. 10 is a plan view showing the supporting member in which a detection circuit unit is disposed.

As shown in FIG. 10, the detection circuit unit 82 is formed by mounting a plurality of electric parts 142 for providing the sensor driving circuit 80 and the like on a circuit board 141. The circuit board 141 has a substantially rectangular flat plate-like configuration in accordance with the board mounting part 102 provided in the base part 90. A width of the circuit board 141 in the shorter direction is formed to be substantially equal to a width of the base part 90 in the shorter direction, and a length of the circuit board 141 in the longitudinal direction is formed to be substantially equal to a length of the board mounting part 102 in the longitudinal direction. In this circuit board 141, eight through-holes (substrate-side connecting portions) 143 which penetrate through the circuit board 141 in the thickness direction are formed. The eight through-holes 143 are provided in positions corresponding to the eight connecting pin 91d to 98d, and provided by four at respective both end parts in the longitudinal direction of the circuit board 141 with an equal interval in the shorter direction of the circuit board 141.

The plurality of electric parts 142 are arranged on both sides in the thickness direction of the circuit board 141 respectively, and some of the electric parts 142 protrude in the thickness direction of the circuit board 141. In addition, the electric parts 142 mounted on the circuit board 141 includes a resistor 145 (Cf. FIG. 2) that is interposed between the electrode wire 4a and the electrode wire 44, and the electrode wire 43 and the electrode wire 44 are electrically conducted to each other through the resistor 145. Further, the electric parts 142 mounted on the circuit board 141 includes a buffer amplifier 146 (cf. FIG. 2) connected to a ground GND, and the buffer amplifier 146 is provided for keeping a potential of the guard electrode 25 be equal to a potential of the detecting electrode 51.

The detection circuit unit 82 is disposed on the board mounting part 102 from the thickness direction of the base part 90. The connecting pins 91d to 98d supported by the base part 90 are disposed in positions corresponding to the eight through-holes 143 formed in the circuit board 141, so that the connecting pins 91d to 98d are inserted into the respective corresponding through-holes 143 in accordance with arrangement of the circuit board 141 on the board mounting part 102. In accordance with the insertion of the connecting pins 91d to 98d into the respective through-holes 143, the connecting pins 91d to 98d are engaged with the through-holes 143 respectively and the connecting pins 91d to 98d and the through-holes 143 are provided to be connectable with each other.

When the detection circuit unit 82 is arranged on the board mounting part 102, the mounting face 102a abuts with the circuit board 141 and the detection circuit unit 82 is supported by the supporting member 81. The detection circuit unit 82 disposed on the board mounting part 102 is located at a side closer to the mounting face 102a than the attaching face 90a without shifting from the attaching face 90a of the base part 90 to outside of the base part 90. In addition, the detection circuit unit 82 is disposed on the board mounting part 102 provided as a recess in the thickness direction of the base part 90, so that movement of the detection circuit unit 82 in the longitudinal direction with respect to the base part 90 is restricted by means of the base part 90. When the detection circuit unit 82 is disposed on the board mounting part 102, the electric parts 142 that are mounted on the side of the mounting face 102a in the circuit board 141 and protrude in the thickness direction of the circuit board 141 between the circuit board 141 are accommodated in the arrangement recess 102b (cf. FIG. 7B). Further, among the electric parts 142 that are mounted on the side of the mounting face 102a in the circuit board 141, some of the electric parts 142 protruding in the thickness direction of the base part 90 more than a depth of the arrangement recess 102b are accommodated in a first electric part-accommodating part 102c (cf. FIG. 7B). Still further, a part of the electric parts 142 that are mounted on the side of the mounting face 102a in the circuit board 141 and protrude in the thickness direction of the circuit board 141 between the circuit board 141 are accommodated in a second electric part-accommodating part 102d (cf. FIG. 7A).

After the circuit board 141 is arranged on the board mounting part 102, the respective connecting pins 91d to 98d and the respective through-holes 143 are electrically connected by soldering. Thereby, the detection circuit unit 82 is electrically connected to the first to eighth terminals 91 to 98.

Figure 11A:
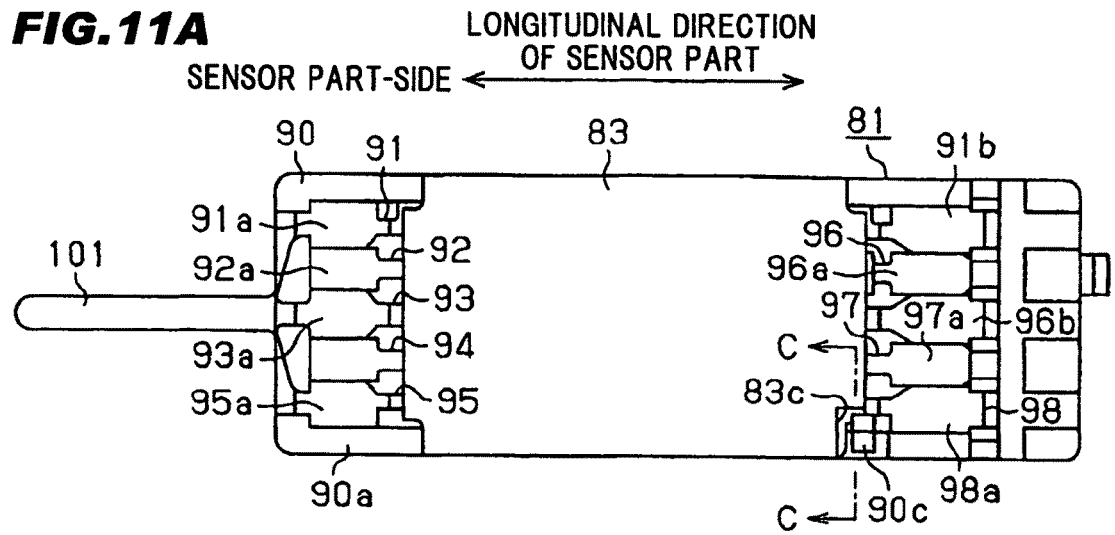
FIG. 11A is a plan view showing the supporting member with which a cover is assembled in the first embodiment.
Figure 11B:
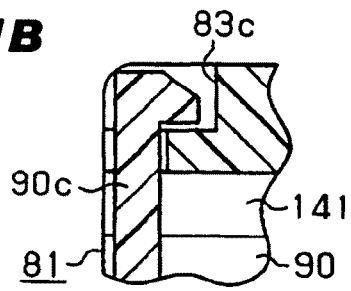
FIG. 11B is a partial cross-sectional view showing the supporting member with which the cover is assembled in the first embodiments followed (cut along C-C line in FIG. 11A)
Figure 12A:
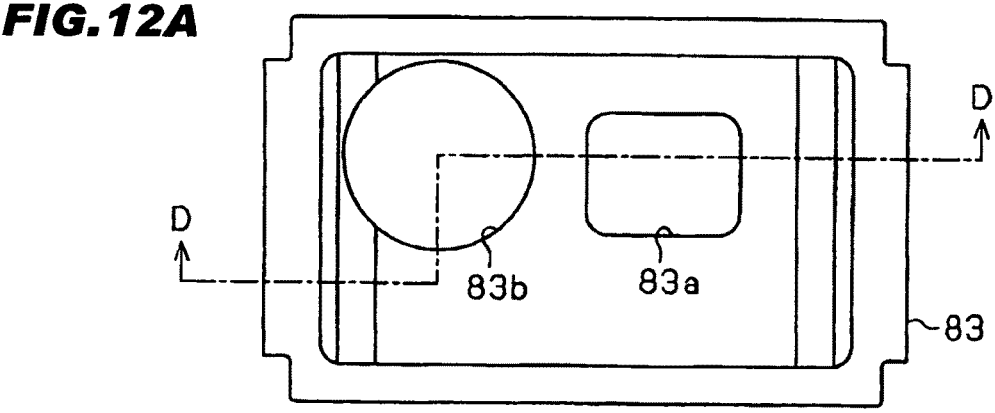
FIG. 12A is a back view showing the cover.
Figure 12B:
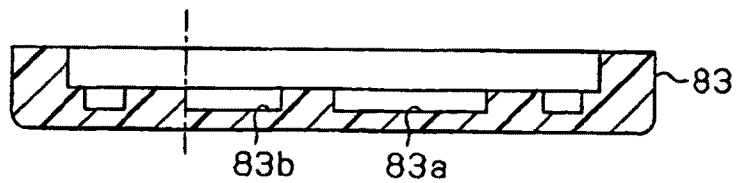
FIG. 12B is a cross-sectional view showing the cover (cut along D-D line in FIG. 12A)

As shown in FIG. 11A, a cover 83 which covers the detection circuit unit 82 is fixed to the base part 90. This cover 83 comprises an insulative resin material that is same as the material of the base part 90, and has a substantially rectangular dish-shape corresponding to the board mounting part 102. As shown in FIG. 12A and FIG. 12B, a third electric part-accommodating part 83a and a fourth electric part-accommodating part 83b that are concaved in a thickness direction of the cover 83 are formed at an inner periphery surface of the cover 83. Furthermore, as shown in FIG. 11A and FIG. 11B, an engaging recess 83c with which a snap-fit engaging claw 90c is engaged is formed at a corner of the cover 83. The snap-fit engaging claw 90c is formed to be integral with the base part 90 and to extend along the thickness direction of the base part 90. The cover 83 is located with respect to the base part 90 in such a manner that the detection circuit unit 82 is interposed between the base part 90 and the cover 83. The cover 83 covers a face on a side opposite to the base part 90 in the detection circuit unit 82 and the snap-fit engaging claw 90c is snap-fit engaged with the engaging recess 83c, so that the cover 83 is fixed to the base part 90. The part of the electric parts 142 that protrude in the thickness direction of the circuit board 141 between the cover 83 and the circuit board 141 are accommodated in the third electric part-accommodating part 83a and the fourth electric part-accommodating part 83b of the cover 83 fixed to the base part 90.

As shown in FIG. 6A and FIG. 6C, any of the first to fourth electrode wires 41 to 44, the detecting electrode 51, and the first to fifth leading wires 71 to 75 of the sensor part 12 is electrically connected by resistance welding to the first to eighth terminal ends 91a to 98a of the first to eighth terminals 91 to 98 supported by the base part 90. More concretely, the connecting terminal part 51a of the detecting electrode 51 passed through the sensor-side guide groove 111 is connected to the terminal end 93a of the third terminal 93, which is disposed on the side of the attaching face 90a at an end part on the side of the sensor part 12 in the base part 90. The connecting terminal part 42a of the electrode wire 42 and the connecting terminal part 43a of the electrode wire 43 respectively passed through the sensor-side guide grooves 112 and 113 provided on both sides of the sensor-side guide groove 111 are connected to the terminal end 91a of the first terminal 91 and the terminal end 95a of the fifth terminal 95 that are disposed on the side of the attaching face 90a at an end part on the side of the sensor part 12 in the base part 90. In addition, the connecting terminal part 41a of the first electrode wire 41 and the connecting terminal part 44a of the fourth electrode wire 44 respectively passed through the sensor-side guide grooves 114 and 115 are connected to the terminal end 92a of the second terminal 92 and the terminal end 94a of the fourth terminal 94 that are disposed on the side of the supporting face 90b at the end part on the opposite side to the sensor part 12 in the base part 90. The first to third leading wires 71 to 73 respectively passed through the feeding-side guide grooves 121 to 123 are connected to the terminal end 91a of the first terminal 91, the terminal end 96b of the fifth terminal 96 and the terminal end 98a of the eighth terminal 98 that are disposed on the side of the attaching face 90a at the end part on the opposite side to the sensor part 12 in the base part 90. The fourth and fifth leading wires 74 and 75 respectively passed through the feeding-side guide grooves 124 and 125 are connected to the terminal end 96a of the sixth terminal 96 and the terminal end 97a of the seventh terminal 97 that are disposed on the side of the attaching face 90a at the end part on the opposite side to the sensor part 12 in the base part 90.

In this embodiment, the first leading wire 71 is provided for signal output, and the second leading wire 72 is connected to the ground GND. In addition, the third leading wire 73 is provided for signal output, the fourth leading wire 74 is connected to the guard electrode 25, and the fifth leading wire 75 is provided for supplying a power source to the detection circuit unit 82. Furthermore, it is connected to the first to third and fifth leading wires 71 to 73 and 75 are connected to a door ECU 171 as described below (cf. FIG. 2).

The first to fourth electrode wires 41 to 44, the detecting electrode 51 and the first to fifth leading wires 71 to 75 are electrically connected to the detection circuit unit 82 via the first to eighth terminals 91 to 98, so that the electrode wires 41 to 44 and the detecting electrode 51 are electrically connected to the first to fifth leading wires 71 to 75. In addition, the second electrode wire 42 and the first leading wire 71 respectively connected to the terminal ends 91a and 91b provided the both ends of the first terminal 91 are directly short-circuited by the first terminal 91, so that an electrical signal (i.e. a voltage detecting signal S3 described later) output from the electrode wire 42 is directly output from the first leading wire 71 without the detection circuit unit 82 to the door ECU (cf. FIG. 2). Furthermore, the third and fourth electrode wires 43 and 44 are electrically connected to the detection circuit unit 82 via the fourth and fifth terminals 94 and 95, so that the third and fourth electrode wires 43 and 44 are electrically connected to the resistor 145 (cf. FIG. 2) mounted on the circuit board 141 via the fourth and fifth terminals 94 and 95. As a result, the third and fourth electrode wires 43 and 44 are electrically conducted to each other via the resistor 145. The detecting electrode 51 is electrically connected to the detection circuit unit 82 via the third terminal 93, so that the detecting electrode 51 is electrically connected to a buffer amplifier 146 (cf. FIG. 2) mounted on the circuit board 141 and electrically connected to the guard electrode 25 via the fourth leading wire 74 that is connected to the detection circuit unit 82 via the sixth terminal 96.

As shown in FIG. 6A to FIG. 6C, an outer periphery of the supporting member 81, in which the detection circuit unit 82 and the cover 83 are disposed and to which the first to fifth leading wires 71 to 75 and the sensor part 12 are connected, is coated with a jacket member 151 having no water permeability. In this embodiment, the jacket member 151 comprises a heat-shrinkable tube, and the jacket member 151 coats the supporting member 81, the detection circuit unit 82, the end part of the sensor part 12 on the side of the supporting member 81, and the end parts of the first to fifth leading wires 71 to 75 on the side of the supporting member 81.

As shown in FIG. 2, a sensor driving circuit 80 comprises an electrostatic capacitance detecting section 162 and a determination section 163. As shown in FIG. 2, the detecting electrode 51 is electrically connected to the capacitance detecting section 162. The electrostatic capacitance detecting section 162 together with the sensor part 12 and the determination section 163 carries out a non-contact detecting function for detecting a conductive foreign object X1 which is in proximity of the front end portion 5a of the door panel 5 in a non-contact manner.

The electrostatic capacitance detecting section 162 detects an electrostatic capacitance C1 between the detecting electrode 51 and the first to fourth electrode wires 41 to 44, and outputs an electrostatic capacitance detecting signal S1 corresponding to a floating capacitance C2 between the conductive foreign object X1 in the proximity of the sensor part 12 and the detecting electrode 51 to the determination section 163. When a distance between the sensor part 12 and the foreign object X1 is shortened, a value of the floating capacitance C2 between the detecting electrode 51 and the foreign object X1 is increased, so that the electrostatic capacitance C1 between the detecting electrode 51 and the first to fourth electrode wires 41 to 44 is changed. In the electrostatic capacitance detecting section 162, a potential level of the electrostatic capacitance detecting signal S1 to be output comes is changed in accordance with change in with the electrostatic capacitance C1 between the detecting electrode 51 and the first to fourth electrode wires 41 to 44.

The determination section 163 determines as to whether the conductive foreign object X1 exists between the front end portion 5a of the door panel 5 and the door opening 4 for passengers based on the electrostatic capacitance detecting signal S1 output from the electrostatic capacitance detecting section 162. The determination section 163 has a threshold value for detecting the proximity of the conductive foreign object X1 to the sensor part 12. This threshold value is determined based on the electrostatic capacitance detecting signal S1 output by the electrostatic capacitance detecting section 162 when close operation of the door panel 5 is carried out in a state that there is no foreign object between a peripheral portion of the door opening 4 for passengers and the front end portion 5a of the door panel 5. The determination section 163 compares a detected value based on the electrostatic capacitance detecting signal S1 (e.g. an voltage value of the electrostatic capacitance detecting signal S1) with the threshold value corresponding to a position of the door panel 5 at the time of the close operation of the door panel 5, and determines the presence of the conductive foreign object X1 in the proximity of the sensor part 12 (i.e. the presence of the conductive foreign object X1 existing between the front end portion 5a of the door panel 5 and the peripheral portion of the door opening 4 for passengers) as a result of the comparison. In this embodiment, the determination section 163 determines that there is the foreign object X1 in the proximity of the sensor part 12 when the detected value based on the electrostatic capacitance detecting signal S1 is greater than the threshold value, and outputs a proximity detecting signal S2 showing that the foreign object X1 in the proximity of the sensor part 12 is detected.

Figure 3C:
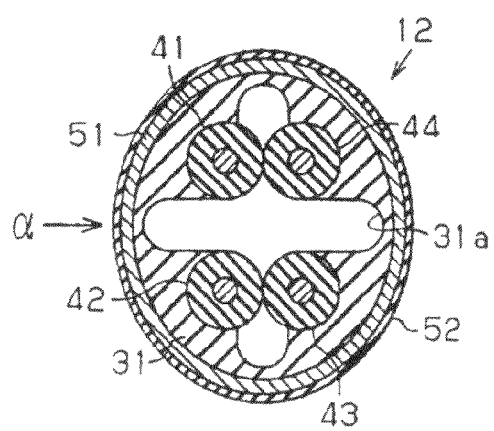

In addition, electric current is supplied to the first electrode wire 41 via the determination section 163. The first electrode wire 41 carries out a contact detecting function for detecting the foreign object X1 or a foreign object X2 (cf. FIG. 1) existing between the door panel 5 and the peripheral portion of the door opening 4 for passengers, together with the second to fourth electrode wires 42 to 44 and the resistor 145, by contacting the foreign object X1 or the foreign object X2. More concretely, as shown in FIG. 2 and FIG. 3B, in a normal state where a pressing force is not applied to the sensor part 12, the electric current supplied to the first electrode wire 41 from the determination section 163 flows from the first electrode wire 41 to the third and fourth electrode wires 43 and 44 to the second electrode wire 42 via the resistor 145. On the other hand, as shown in FIG. 2 and FIG. 3C, in a state where the pressing force is applied to the sensor part 12, for example, from a direction indicated by an arrow α, the insulative coating 52, the detecting electrode 51 and the insulating layer 31 are elastically deformed, so that either the first electrode wire 41 or the third electrode wire 43 contact with either the second electrode wire 42 or the fourth electrode wire 44 to be electrically conducted to each other and short-circuited. Then, the electric current from the first electrode wire 41 to the second electrode wire 42 through the electrode wires 43 and 44 flows without passing through the resistor 145, a voltage value between the first electrode wire 41 and the second electrode wire 42 is changed compared with the a voltage value between the first electrode wire 41 and the second electrode wire 42 in the normal state. Therefore, in the normal state, the voltage detecting signal S3 at an L-level (a low voltage level) is output from the second electrode wire 42. On the other hand, when either the first electrode wire 41 or the third electrode wire 43 contacts with either the second electrode wire 42 or the fourth electrode wire 44 to be electrically conducted to each other and short-circuited, the voltage detecting signal S3 at an H-level (a high voltage level) is output from the second electrode wire 42. In other words, the voltage detecting signal S3 at the H-level is a voltage signal showing the presence of the foreign object X1 or the foreign object X2 which contacts to the sensor part 12. Then, the voltage detect signal S3 is output to the door ECU 171 via the first terminal 91. In addition, when the pressing force applied to the sensor part 12 is removed, the insulative coating 52, the detecting electrode 51 and the insulating layer 31 are restored to the original state, so that the first to fourth electrodes wires 41 to 44 are also restored to the original state, thereby restoring a non-conductive state.

As shown in FIG. 2, the electric sliding door apparatus 1 in this embodiment is controlled by the door ECU 171. The door ECU 171 comprises a ROM (Read only Memory), a RAM (Random access Memory) and the like, and functions as microcomputer. The door ECU 171 is disposed in vicinity of the slide actuator 6, for example. A drive power source is supplied to the door ECU 171 from a battery (not shown) of the vehicle 2, and the door ECU 171 is connected to the ground GND (grounded to the vehicle body 3). In addition, the door ECU 171 supplies the power source to a sensor driving circuit 80, and control the slide actuator 6 based on various signals input from the position detecting apparatus 8, the operation switch 9 and the determination section 163.

Next, an operation of the electric sliding door apparatus 1 configured as described above will be explained in a general manner. When an open signal is input from the operation switch 9, the door ECU 171 drives the slide actuator 6 to carry out open operation of the door panel 5. Herein, the door ECU 171 recognizes the position of the door panel 5 based on the position detection signal input from the position detecting apparatus 8. In this embodiment, the door ECU 171 counts a pulse number of the position detecting signals and recognizes the position of the door panel 5 based on a count value. When the door panel 5 is located at a full-open position Po in which the door panel 5 completely opens the door opening 4 for passengers (cf. FIG. 1), the door ECU 171 stops the slide actuator 6.

On the other hand, when a close signal is input from the operation switch 9, the door ECU 171 drives the slide actuator 6 to carry out a close operation of the door panel 5. When the door panel 5 is located at a full-close position Pc in which the door panel 5 completely closes the door opening 4 for passengers (cf. FIG. 1), the door ECU 171 stops the slide actuator 6. In addition, when the proximity detecting signal S2 or the voltage detecting signal S3 at the H-level is input during the close operation of the door panel 5, the door ECU 171 reverses the slide actuator 6 and carries out the open operation of the door panel 5 only for a predetermined distance, thereafter stops the slide actuator 6.

In addition, a potential of the guard electrode 25 is kept to be equal to that of the detecting electrode 51 by means of the buffer amplifier 146 during the close operation of the door panel 5. Therefore, an influence of a disturbance on the electrostatic capacitance C1 detected by the detecting electrode 51 is suppressed by the guard electrode 25. In other words, when the conductive foreign object X1 approximates to the sensor part 12 via the guard electrode 25, it is possible to suppress the change in the electrostatic capacitance C1 detected by using the detecting electrode 51 due to the proximity of the foreign object X1, since the electric potential of the guard electrode 25 is kept to be equal to that of the detecting electrode 51. On the other hand, when there is the conductive foreign object X1 which approximates to the sensor part 12 from a front side of the door panel 5, the guard electrode 25 is not interposed between the foreign object X1 and the detecting electrode 51, so that the electrostatic capacitance C1 detected by the detecting electrode 51 is changed and the foreign object X1 is detected.

Next, a method for manufacturing the foreign object detection sensor 11 in the first embodiment will be explained.

At first, as shown in FIG. 13A and FIG. 13B, a terminal material forming step of forming a terminal forming material 181 for the first to eighth terminals 91 to 98 is carried out.

In the material forming step, as shown in FIG. 13A, a conductive sheet metal is firstly punched to provide a flat plate-shaped terminal forming material 181. The flat plate-shaped terminal forming material 181 has a configuration in which the first to eighth terminals 91 to 98 extended in a flat plate-shape are connected by a terminal connecting part 181a. In the flat plate-shaped terminal forming material 181, alternately-located three terminal ends 91a, 93a and 95a are disposed outside of other two terminal ends 92a and 94a among five terminal ends 91a to 95a disposed on one side in the longitudinal direction, and the five terminal ends 91a to 95a are alternately located in one plane. Similarly, in the flat plate-shaped terminal forming material 181, alternately-located three terminal ends 91b, 96b and 98b are disposed outside of other two terminal ends 96a and 97a among five terminal ends 96a to 98a, 91b, and 96b disposed on another side in the longitudinal direction, and five terminal ends 96a to 98a, 91b, and 96b are alternately located in one plane.

Subsequently, as shown in FIG. 13B, the flat plate-shaped terminal forming material 181 are bent at plural portions by press working. According to this press working, the terminal ends 91a to 98a, 91b, and 96b that are adjacent to each other in the shorter direction are formed to comprise level differences from each other in the thickness direction (vertical direction to the sheet of FIG. 13B), and the connecting pins 91d to 98d are raised to be perpendicular to the connecting parts 91c to 98c. In the terminal forming material 181 after bending, the adjacent terminal ends 91a to 98a, 91b and 96b that are separated by five are adjacently provided in one straight line when viewed from a tip portion (nose) side of the connecting pins 91d to 98d. In addition, the connecting pins 91d to 98d are disposed to be parallel with each other.

Figure 14A:
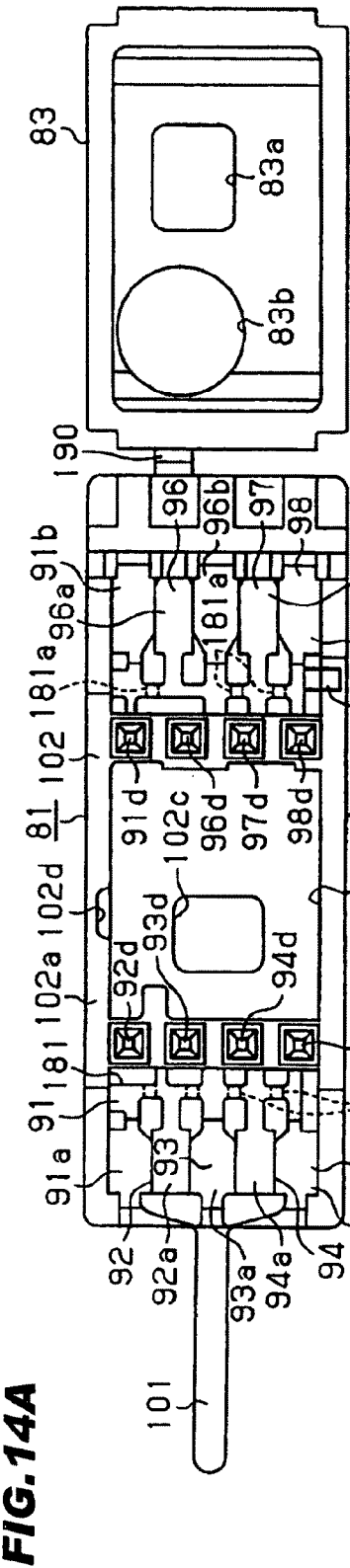
FIGS. 14A to 14C are explanatory diagrams showing a method for manufacturing a foreign object detection sensor in the first embodiment.

Next, as shown in FIG. 14A, a base part forming step of forming the base part 90 in which the terminal forming material 181 partially embedded to be supported is carried out. In the first embodiment, this base part forming step corresponds to a supporting member forming step. In this base part forming step, the base part 90 and the cover 83 are made of the same material by integral molding. More concretely, an integrally-molded member, in which one end in the longitudinal direction of the cover 83 is connected to one end in the longitudinal direction of the base part 90 on a side opposite to the inserting portion 101 via a cut portion 190 is formed. In order to form the base part 90 integrally formed with the cover 83, a forming die (not shown) comprising a cavity for forming the base part 90, a cavity for forming the cover 83, and a cavity for communicating the cavity for forming the base part 90 and the cavity for forming the cover 83 and forming the cut portion 190 is used. After the terminal forming material 181 is provided in the cavity for forming the base part 90 of the forming die, a melt of an insulative resin material is filled in the respective cavities. Subsequently, the insulative resin material is solidified in the forming die, so that the base part 90 integrally molded with the cover 83 is completed. The completed base part 90 is taken out from the forming die.

The base part 90 is formed as described above, so that the terminal forming material 181 is insert-molded in the base part 90 and partially embedded in the base part 90. The formed base part 90 supports the terminal forming material 181 in such a manner that the longitudinal direction of the base part 90 coincides with the longitudinal direction of the terminal forming material 181. On the both sides in the longitudinal direction of the terminal forming material 181, the adjacent terminal ends 91a to 98a, 91b and 96b separated by five are adjacently provided in one straight line along the shorter direction of the terminal forming material 181 when viewed from the tip portion (nose) side of the connecting pins 91d to 98d. Accordingly, the base part 90 supports the first to eighth terminals 91 to 98 in such a manner that the adjacent terminal ends 91a to 98a, 91b and 96b separated by five are adjacently provided along the direction perpendicular to the longitudinal direction of the base part 90 at both ends in the longitudinal direction of the base part 90 (the same direction as the longitudinal direction of the sensor part 12 in the foreign object detection sensor 11).

Next, a cutting step of cutting and removing the terminal connecting part 181a which connects the first to eighth terminals 91 to 98 in the terminal forming material 181 is carried out.

In this cutting step, the terminal connecting part 181a is cut to be removed at seven positions e.g. by the press working, and the first to eighth terminals 91 to 98 are separated from each other.

Figure 14B:
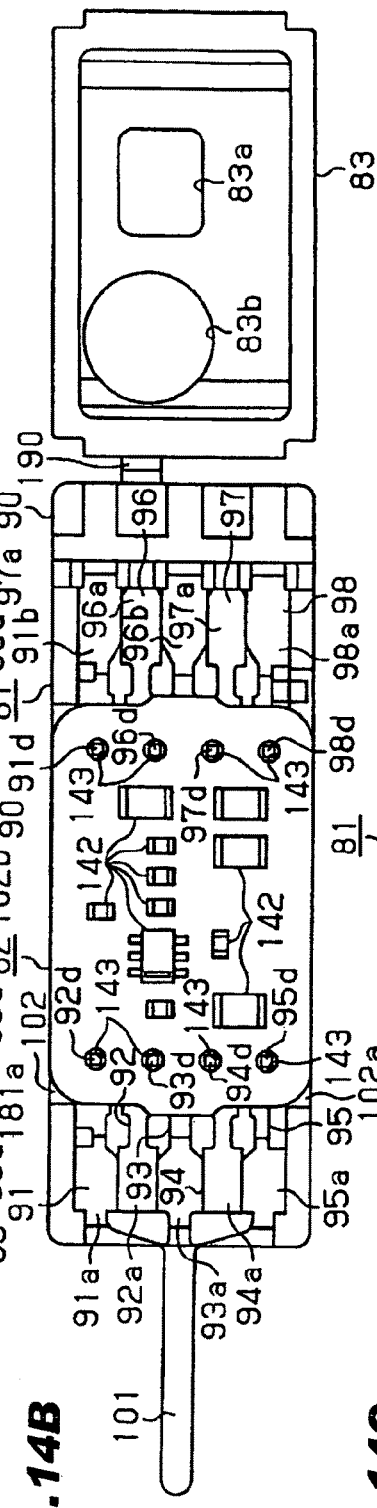

Next, as shown in FIG. 14B, an arrangement step of disposing the detection circuit unit 82 with respect to the supporting member 81 is carried out.

In this arrangement step, the circuit board 141 in the detection circuit unit 82 is located to face to the board mounting part 102 of the base part 90 in the thickness direction, and the circuit board 141 and the board mounting part 102 are moved relatively along the thickness direction e thickness such that the circuit board 141 approximates to the board mounting part 102, thereby disposing the circuit board 141 on the mounting face 102a of the board mounting part 102. Herein, the eight connecting pins 91d to 98d protruded from the board mounting part 102 are disposed in positions corresponding to the eight through-holes 143 formed in the circuit board 141, so that the eight connecting pins 91d to 98d are respectively inserted into the eight through-holes 143 in accordance the relative movement of the circuit board 141 toward the board mounting part 102. In accordance with the insertion of the connecting pins 91d to 98d into the respective through-holes 143, the connecting pins 91d to 98d are engaged with the through-holes 143 respectively and the connecting pins 91d to 98d and the through-holes 143 are provided to be connectable with each other. Further, in accordance with the relative movement of the circuit board 141 toward the board mounting part 102, some of the electric parts 142 that are mounted on the circuit board 141 and protrude in the thickness direction of the circuit board 141 between the circuit board 141 and the board mounting part 102 are accommodated in the first electric part-accommodating part 102c and the second electric part-accommodating part 102d that are facing thereto in the thickness direction of the circuit board 141 (cf. FIG. 14A).

Next, a connecting part connection step (connection step) of electrically connecting the respective through-holes 143 with the respective connecting pins 91d to 98d inserted into the through-holes 143 is carried out.

In this connecting part connection step, the respective through-holes 143 are electrically connected to the respective connecting pin 91d to 98d inserted into the through-holes 143 by soldering. According to this step, the detection circuit unit 82 and the first to eighth terminals 91 to 98 are electrically connected to each other.

Next, a separation step of separating the cover 83 from the base part 90 is carried out. In this separation step, the cover 83 and the base part 90 are separated at the cut portion 190.

Figure 14C:
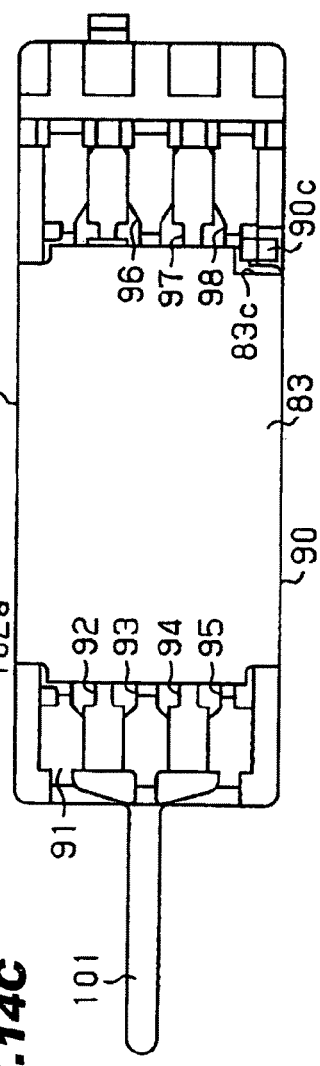

Next, as shown in FIG. 14C, a cover assembly step of assembling the cover 83 to the base part 90 is carried out. In this cover assembly step, the cover 83 separated from the base part 90 in the separation step is disposed to the base part 90 to cover the detection circuit unit 82. The snap-fit engaging claw 90c integrally formed with the base part 90 is snap-fit engaged with the engaging recess 83c, so that the cover 83 is fixed to the base part 90. At this time some of the electric parts 142 that are mounted on the circuit board 141 and protrude in the thickness direction of the circuit board 141 between the cover 83 and the circuit board 141 are accommodated in the third electric part-accommodating part 83a and the fourth electric part-accommodating part 83b (cf. FIG. 14A).

Next, a terminal end connection step (connection step) of electrically connecting the first to fourth electrode wires 41 to 44, the detecting electrode 51, and the first to fifth leading wires 71 to 75 to the respective terminal ends 91a to 98a, 91b and 96b by resistance welding. In the terminal end connection step, as shown in FIG. 6A, the connecting terminal part 51a of the detecting electrode 51 passed through the sensor-side guide groove 111 is connected to the terminal end 93a of the third terminal 93, which is disposed on the side of the attaching face 90a at the end part on the side of the sensor part 12 in the base part 90. The connecting terminal part 42a of the electrode wire 42 and the connecting terminal part 43a of the electrode wire 43 respectively passed through the sensor-side guide grooves 112 and 113 provided on the both sides of the sensor-side guide groove 111 are connected to the terminal end 91a of the first terminal 91 and the terminal end 95a of the fifth terminal 95 that are disposed on the side of the attaching face 90a at the end part on the side of the sensor part 12 in the base part 90. Further, as shown in FIG. 6C, the connecting terminal part 41a of the first electrode wire 41 and the connecting terminal part 44a of the fourth electrode wire 44 respectively passed through the sensor-side guide grooves 114 and 115 are connected to the terminal end 92a of the second terminal 92 and the terminal end 94a of the fourth terminal 94 that are disposed on the side of the supporting face 90b at the end part on the opposite side to the sensor part 12 in the base part 90. As shown in FIG. 6A, the first to third leading wires 71 to 73 respectively passed through the feeding-side guide grooves 121 to 123 are connected to the terminal end 91a of the first terminal 91, the terminal end 96b of the fifth terminal 96 and the terminal end 98a of the eighth terminal 98 that are disposed on the side of the attaching face 90a at the end part on the opposite side to the sensor part 12 in the base part 90. As shown in FIG. 6C, the fourth and fifth leading wires 74 and 75 respectively passed through the feeding-side guide grooves 124 and 125 are connected to the terminal end 96a of the sixth terminal 96 and the terminal end 97a of the seventh terminal 97 that are disposed on the side of the attaching face 90a at the end part on the opposite side to the sensor part 12 in the base part 90. Herein, the order of connecting the first to fourth electrode wires 41 to 44, the detecting electrode 51 and the first to fifth leading wires 71 to 75 to the respective terminal ends 91a to 98a, 91b, and 96b may be arbitrary determined.

Next, a coating step of coating the outer periphery of the supporting member 81 with the jacket member 151 is carried out. In the supporting member 81, the detection circuit unit 82 and the cover 83 are already assembled and the first to fifth leading wires 71 to 75 and the sensor part 12 are already connected to the supporting member 81. In the coating step, the jacket member 151 comprising a cylindrical heat-shrinkable tube having no water permeability into which the support member 81 can be inserted is extrapolated to the supporting member 81, in which the detection circuit unit 82 and the cover 83 are assembled and to which the first to fifth leading wires 71 to 75 and the sensor part 12 are connected. According to this step, a region extending from the end part of the sensor part 12 on the side of the supporting member 81 to the end part of the first to fifth leading wires 71 to 75 on the side of the supporting member 81 is coated with the jacket member 151. Then, the jacket member 151 is shrunk by heating such that the jacket member 151 adheres to the supporting member 81. The coating step is finished by completing the installation of the jacket member 151 to the supporting member 81, thereby completing the foreign object detection sensor 11.

According to the first embodiment, following functions and effects can be provided.

(1) The detection circuit unit 82 is arranged on the board mounting part 102 provided in the base part 90 of the supporting member 81 and the mounting face 102a abuts with the circuit board 141, so that the detection circuit unit 82 is supported by the supporting member 81. Therefore, the position of the detection circuit unit 82 is stabilized by being supported by the supporting member 81, so that it is possible to electrically connect the detection circuit unit 82 to the first to fourth electrode wires 41 to 44 and the detecting electrode 51 with ease. In addition, the sensor terminal 13 is provided at the one end of the sensor part 12 in the longitudinal direction. By arranging the detection circuit unit 82 which carries out the proximity detecting function and the contact detecting function in the supporting member 81 constituting the sensor terminal 13, it is no longer necessary to pull out wirings for electrically connecting the first to fourth electrode wires 41 to 44 and the detecting electrode 51 to the detection circuit unit 82 (i.e. the connecting terminal parts 41a to 44a) to a distant area, so that it is possible to shorten such wirings. Therefore, the wiring in the sensor terminal 13 can be simplified. In addition, by shortening a wiring for electrically connecting the detecting electrode 51 to the detection circuit unit 82 (i.e. the connecting terminal part 51a), it is possible to suppress the influence of the disturbance by an external factor on the electrical signal output from the detecting electrode 51 for detecting the proximity of the conductive foreign object X1 between the sensor part 12 and the detecting circuit unit 82.

(2) The electrode wire 44, the detecting electrode 51 and the first to fifth leading wires 71 to 75 are electrically connected to the detection circuit unit 82 via the first to eighth terminals 91 to 98, so that the connection of the electrode wire 44, the detecting electrode 51, and the first to fifth leading wires 71 to 75 to the detection circuit unit 82 can be stabilized. In addition, a rigidity of the supporting member 81 is increased by the first to eighth terminals 91 to 98, so that the detection circuit unit 82 can be supported by the supporting member 81 more stably.

(3) In the board mounting part 102, the eight connecting pins 91d to 98d provided in the supporting member 81 are disposed in positions corresponding to the eight through-holes 143 formed in the circuit board 141. Therefore, when the circuit board 141 is disposed on the board mounting part 102 in the arrangement step, in accordance with the relative movement of the circuit board 141 toward the board mounting part 102, the connecting pins 91d to 98d are inserted into and engaged with the through-holes 143 respectively and the connecting pins 91d to 98d and the through-holes 143 are provided to be connectable with each other. Therefore, a configuration for connecting the first to eighth terminals 91 to 98 to the detection circuit unit 82 is simplified, and it is possible to electrically connect the first to eighth terminals 91 to 98 to the detection circuit unit 82 more easily in the connecting part connection step.

(4) The connecting terminal parts 41a to 44a provided at the end parts of the first to fourth electrode wires 41 to 44 on the side of the sensor terminal 13 and the connecting terminal part 51a provided at the end part of the detecting electrode 51 on the side of the sensor terminal 13 are respectively connected to the terminal ends 91a to 95a of the first to fifth terminals 91 to 95 by the welding with high bonding property, so that the connecting terminal part 41a to 44a and the connecting terminal part 51a are strongly and securely connected to the of the first to fifth terminals 91 to 95. The first to fifth leading wires 71 to 75 are respectively connected to the connecting terminal parts 91b, 96a, 96b, 97a and 98a of the first and sixth to eighth terminals 91 and 96 to 98 by the welding with high bonding property, so that the first to fifth leading wires 71 to 75 are strongly and securely connected to the of the first and sixth to eighth terminals 91 and 96 to 98. In addition, since the rigidity of the first to fifth terminals 91 to 95 is higher than the rigidity of the connecting terminal parts 41a to 44a, and 51a, it is possible to suppress the external force applied to the sensor part 12 to act on the circuit board 141 through the first to fifth terminals 91 to 95. Similarly, since the rigidity of the first and sixth to eighth terminals 91 and 96 to 98 is higher than the rigidity of the first to fifth leading wires 71 to 75, it is possible to suppress the external force applied to the first to fifth leading wires 71 to 75 to act on the circuit board 141 through the first and sixth to eighth terminals 91 and 96 to 98. Further, even if the connecting pins 92d to 95d and the through-holes 143 are bonded to each other by soldering, it is possible to obtain a reliability of the bonding part, since the external force applied to the sensor part 12 is suppressed to act on the circuit board 141 by means of the first to fifth terminals 91 to 95 having the rigidity higher than that of the connecting terminal parts 41a to 44a and 51a. Accordingly, even if the connecting terminal parts 41a to 44a and 51a are not directly bonded with the circuit board 141 by welding, it is possible to realize a structure that is strong against the external force applied to the sensor part 12. Further, since the welding is not directly carried out in the circuit board 141, it is possible to suppress defectives due to welding heat, for example, the electric parts 142 mounted on the circuit board 141 are damaged by welding heat generated at the time of welding. In addition, it is possible to construe the circuit board 141 and the first to eighth terminals 91 to 98 to be easily connectable with each other, by inserting the connecting pin 91d to 98d having pin-shape through through-holes 143 provided in the circuit board 141.

(5) The circuit board 141 is arranged on the mounting face 102 in such a manner that the circuit board 141 abuts the mounting face 102a that is the bottom plane of the board mounting part 102, so that the detection circuit unit 82 is supported by the supporting member 81. Further, since the board mounting part 102 is formed as a recess by concaving a portion on the side of the attaching face 90a at one end of the base part 90 in the thickness direction of the base part 90, the detection circuit unit 82 is disposed at an area close to the inside of the base part 90. Therefore, it is possible to protect the detection circuit unit 82 by the base part 90 more easily. Furthermore, the electric parts 142 mounted on the side of the mounting face 102a in the circuit board 141 is protected by the base part 90 from the outside of the base part 90, since the electric parts 142 are disposed in the arrangement recess 102b.

(6) Among the electric parts 142 that are mounted on the circuit board 141, some of the electric parts 142 protruding in the thickness direction of the circuit board 141 toward the side of the base part 90 are accommodated in the first electric part-accommodating part 102c and the second electric part-accommodating part 102d. According to this structure, it is possible to shorten the distance between the circuit board 141 and the base part 90, thereby suppressing the increase in dimension in the thickness direction of the circuit board 141 in the sensor terminal 13.

(7) The electric parts 142 that are mounted on the circuit board 141 and protrude in the thickness direction toward the side of the cover 83 are accommodated in the third electric part-accommodating part 83a and the fourth electric part-accommodating part 83b. According to this structure, it is possible to shorten the distance between the circuit board 141 and the cover 83, thereby further suppressing the increase in dimension in the thickness direction of the circuit board 141 in the sensor terminal 13.

(8) The terminal ends 91a to 98a, 91b, and 96b are adjacently provided by five in the direction perpendicular to the longitudinal direction of the sensor part 12 at the both end parts in the longitudinal direction of the base part 90. According to this structure, it is possible to suppress the increase in dimension of the sensor terminal 13 in the longitudinal direction of the sensor part 12. In addition, compared with a case where a plurality of terminal ends are disposed in the longitudinal direction of the sensor part 12, it is possible to avoid the arrangement of the terminal end that is distant from the end part on the side of the sensor terminal 13 in the first to fourth electrode wires 41 to 44 and the detecting electrode 51, so that it is possible to suppress the increase in length of the wiring between the first to fourth electrode wires 41 to 44 and the detecting electrode 51 and the terminal ends 91a to 95a. As a result, it is possible to suppress complexity of the wirings in the sensor terminal 13.

(9) The terminal ends 91a to 98a, 91b, and 96b that are respectively disposed by five at the both end parts in the longitudinal direction of the base part 90 are arranged such that the terminal ends adjacent to each other in the shorter direction of the base part 90 have the level differences therebetween in the thickness direction of the base part 90 (the direction same as the thickness direction of the circuit board 141). Therefore, compared with a case where the adjacent terminal ends do not have the level differences in the thickness direction of the circuit board 141, it is possible to set a width in the adjacent arrangement direction of the plurality of the terminal ends 91a to 98a, 91b and 96b (the direction same as the shorter direction of the base part 90 in the present embodiment) as a larger value. In addition, while the number of the terminal ends is increased since the detecting electrode 51 is added to the first to fourth electrode wires 41 to 44 so as to provide the proximity detecting function as well as pressure-sensitive detecting function, it is possible to suppress reduction in size of the terminal end. Therefore, in the terminal end connection step, it is possible to electrically connect the first to fourth electrode wires 41 to 44, the detecting electrode 51 and the first to fifth leading wires 71 to 75 to the terminal ends 91a to 98a, 91b, and 96 more easily. Further, the terminal ends 91a to 98a, 91b, and 96b that are adjacent to each other in the shorter direction of the base part 90 have the level differences therebetween in the thickness direction of the circuit board 141, the adjacent terminal ends 91a to 98a, 91b, and 96b are distant (separated) from each other in the thickness direction of the circuit board 141, thereby suppressing the short-circuit between the terminal ends 91a to 98a, 91b, and 96b that are adjacent to each other.

(10) The first terminal 91 is arranged to extend along the longitudinal direction of the sensor part 12 with respect to the base part 90, and the connecting part 91c extending along the longitudinal direction of the sensor part 12 is embedded in the base part 90. Further, the second electrode wire 42 and the first leading wire 71 are directly short-circuited by the first terminal 91. When the electrical signal (i.e. the voltage detecting signal S3) output from the second electrode wire 42 is directly output from the first leading wire 7 to the outside (i.e. the door ECU 171), it is not necessary to connect the second electrode wire 42 to the circuit board 141. As in the present embodiment, when the second electrode wire 42 and the first leading wire 71 are directly short-circuited by the first terminal 91, it is no longer necessary to provide a junction for electrically connecting the second electrode wire 42 to the first leading wire 71. As a result, downsizing of the circuit board 141 can be expected. Still further, the first terminal 91 which short-circuits the second electrode wire 42 and the first leading wire 71 is arranged to extend along the longitudinal direction of the sensor part 12 with respect to the base part 90, and the connecting part 91c is embedded in the base part 90, so that the rigidity of the supporting member 81 is increased by the first terminal 91.

(11) The first to eighth terminals 91 to 98 are partially embedded (formed by insert-molding) in the base part 90, so that the positions thereof in the supporting member 81 are easily stabilized. Further, when the first to eighth terminals 91 to 98 are partially embedded (formed by insert-molding) in the base part 90, the insulative resin material constituting the base part 90 is partially interposed between the adjacent terminals 91 to 98. Therefore, the short-circuit between the first to eighth terminals 91 to 98 can be suppressed. In addition, the rigidity of the supporting member 81 is further increased by partially embedding the first to eighth terminals 91 to 98 in the base part 90.

(12) The cover 83 which covers the detection circuit unit 82 is assembled with the base part 90. Therefore, components (parts) composing the detection circuit unit 82 (i.e. the circuit board 141 and the plurality of electric parts 142 mounted on the circuit board 141) are protected by means of the cover 83 against damages such as impact from the outside.

(13) Since the base part 90 and the cover 83 are made from the same material, it is possible to reduce fabrication cost.

(14) The terminal end 93a positioned at the middle of the five terminal ends 91a to 95a provided on the side of the sensor part 12 in the supporting member 81 is disposed on the extended line of the central axis line L1 along the longitudinal direction of the sensor part 12, when viewed from the direction that is perpendicular to the adjacent arrangement direction of the five terminal ends 91a to 95a and perpendicular to the longitudinal direction of the sensor part 12 (i.e. the thickness direction of the base part 90). The detecting electrode 51 provided at the outer periphery of the insulating layer 31 holding the first to fourth electrode wires 41 to 44 is electrically connected to the terminal end 93a. Therefore, it is possible to shorten the distance between the detecting electrode 51 and the terminal end 93a of the third terminal 93 to which the detecting electrode 51 is connected, thereby shortening the wiring between the detecting electrode 51 and the terminal end 93a. In addition, since the wiring between the detecting electrode 51 and the terminal end 93a is shortened, it is possible to suppress the short-circuit between the detecting electrode 51 and the first to fourth electrode wires 41 to 44 in the sensor terminal 13.

(15) The supporting member, the detection circuit unit 82, the end part of the sensor part 12 on the side of the supporting member 81, and the end parts of the first to fifth leading wires 71 to 75 on the side of the supporting member 81 are coated with the jacket member 151, so that ingress of liquid into the sensor terminal 13 can be prevented by the jacket member 151.

(16) When the inserting portion 101 integrally formed with the base part 90 is inserted into the separate hole 31a of the insulating layer 31 constituting the sensor part 12, the inserting portion 101 is engaged with the sensor part 12 in the longitudinal direction of the sensor part 12 by a frictional force between the inner periphery surface of the separate hole 31a and the outer periphery surface of the inserting portion 101. As a result, the supporting member 81 is attached to the one end in the longitudinal direction of the sensor part 12. Therefore, the supporting member 81 can be attached to the sensor part 12 easily by inserting the inserting portion 101 into the separate hole 31a. In addition, since it is not necessary to use extra parts to attach the sensor terminal 13 at the one end in the longitudinal direction of the sensor part 12, it is possible to suppress the increase in the number of parts and to easily carry out the attachment of the sensor terminal 13. Further, the position of the one end part in the longitudinal direction of the sensor part 12 with respect to the supporting member 81 is stabilized by inserting the inserting portion 101 into the separate hole 31a, so that it is possible to easily connect the connecting terminals 41a to 44a and 51a to the terminal ends 91a to 95a.

(17) In the terminal end connection step, the electrical connection of the detection circuit unit 82 with the first to fourth electrode wires 41 to 44 and the detecting electrode 51 is carried out, in a state where the detection circuit unit 82 is supported by the supporting member 81 constituting the sensor part 13, namely, the position of the detection circuit unit 82 is stabilized by the support of the supporting member 81. Therefore, it is possible to easily carry out the electrical connection of the detection circuit unit 82 with the first to fourth electrode wires 41 to 44 and the detecting electrode 51, thereby simplifying the wirings in the sensor terminal 13.

(18) In the base part forming step, the base part 90 and the cover 83 are formed simultaneously by integral molding. Therefore, it is possible to improve productivity of the foreign object detection sensor 11.

(19) The first to fourth electrode wires 41 to 44 and the detecting electrode 51 are led to the terminal ends 91a to 95a by passing through the sensor-side guide grooves 111 to 115 provided in the base part 90 respectively. In addition, the first to fifth leading wires 71 to 75 are led to the terminal ends 96a to 98a, 91b, and 96b by passing through the feeding-side guide grooves 121 to 125 provided in the base part 90 respectively. Therefore, the first to fourth electrode wires 41 to 44 and the detecting electrode 51 can be led easily to the terminal ends 91a to 95a by means of the sensor-side guide grooves 111 to 115, and the first to fifth leading wires 71 to 75 can be led easily to the terminal end 96a to 98a, 91b, and 96b by means of the feeding-side guide grooves 121 to 125. Therefore, it is possible to carry out the interconnection easily.

(20) The first to fourth electrode wires 41 to 44 (connecting terminal part 41a to 44a) can be led more easily to the corresponding terminal ends 91a, 92a, 94 and 95a, by leading the first to fourth electrode wires 41 to 44 to the terminal ends 91a, 92a, 94a, and 95a respectively along the guide faces 112a to 115a provided in the sensor-side guide grooves 112 to 115.

(21) In each opening at the portion on the side closer to the board mounting part 102 than the transversal groove 131, a set of inclined faces 121a, 122a, and 123a that are inclined to increase the interval with each other in accordance with the approximation from the side of the bottom parts toward the openings in the respective feeding-side grooves 121 to 123. Therefore, it is possible to easily insert the first to fifth leading wires 71 to 75 to the feeding-side guide grooves 121 to 125, thereby carrying out the interconnection more easily.

Second Embodiment

Next, the second embodiment according to the present invention will be explained below in conjunction with appended drawings. In the second embodiment, the same elements as those in the first embodiment are indicated by the same reference numerals, and detailed explanation thereof are omitted.

A foreign object detection sensor 201 in the second embodiment shown in FIG. 15A and FIG. 15B is provided in the electric sliding door apparatus 1 in place of the foreign object detection sensor 11 in the first embodiment. A sensor terminal 202 is provided at the end part of the sensor part 12 on the side of the connecting terminal parts 41a to 44a and 51a by the inserting portion 101, similarly to the sensor terminal 13 in the first embodiment. The sensor terminal 202 comprises a supporting member 81 and a detection circuit unit 82 supported by the supporting member 81.

Similarly to the first embodiment, the detection circuit unit 82 is arranged on the board mounting part 102, and the detection circuit unit 82 is supported by the supporting member 81. In other words, the circuit board 141 of the detection circuit unit 82 is arranged on the mounting face 102a that is the bottom plane of the board mounting part 102 and the circuit board 141 abuts with the mounting face 102a, so that the detection circuit unit 82 is supported by the supporting member 81. In addition, the board mounting part 102 is concaved in a substantially rectangular shape from an attaching face 90a (i.e. an upper-side end face in FIG. 15B) at one side of the base part 90 in a thickness direction of the base part 90 to a supporting face 90b at another side of the base part 90 (i.e. a lower-side end face in FIG. 15B). A depth of the board mounting part 102 is formed to be deeper than a thickness of the detection circuit unit 82. Therefore, the detection circuit unit 82 disposed on the board mounting part 102 is located at a side closer to the mounting face 102a than the attaching face 90a without shifting from the attaching face 90a of the base part 90 to outside of the base part 90.

Among electric parts 142 mounted on the circuit board 141 arranged on the board mounting part 102, some electric parts 142 that are mounted on the side of the mounting face 102a with respect to the circuit board 141 are accommodated in an arrangement recess 102b. Further, among the electric parts 142 that are mounted on the side of the mounting face 102a with respect to the circuit board 141, some electric parts 142 protruding more than a depth of an arrangement recess 102b are accommodated in a first electric part-accommodating part 102c. Still further, a part of the electric parts 142 that are mounted on the side of the mounting face 102a with respect to the circuit board 141 are accommodated in a second electric part-accommodating part 102d.

Eight connecting pins 91d to 98d of first to eighth terminals 91 to 98 supported by the supporting member 81 are inserted into eight through-holes 143 formed in the circuit board 141. The eight connecting pins 91d to 98d respectively inserted into the eight through-holes 143 are electrically connected to the through-holes 143 by soldering, thereby electrically connecting the detection circuit unit 82 with the first to eighth terminals 91 to 98.

Similarly to the first embodiment, any of first to fourth electrode wires 41 to 44, the detecting electrode 51, and the first to fifth leading wires 71 to 75 of the sensor part 12 is electrically connected by resistance welding to the terminal ends 91a to 98a, 91b, and 96b of the first to eighth terminals 91 to 98 supported by the supporting member 81 (see FIG. 6C as to the fourth electrode wire 44 and the fourth leading wire 74).

An outer periphery of the supporting member 81, in which the detection circuit unit 82 is disposed and to which the sensor part 12 and the first to fifth leading wires 71 to 75 are connected, is coated with a jacket member 203 having no water permeability. In this embodiment, the jacket member 203 comprises a double-layered heat-shrinkable tube comprising a cylindrical coating layer 203a, and a melting layer 203b integrally provided at an inner periphery of the coating layer 203a, and the melting layer 203b is interposed between the coating layer 203a and the supporting member 81. The coating layer 203a comprises a resin material having no water permeability, and the melting layer 203b comprises an insulative resin material. After the jacket member 203 is arranged at an outer periphery of a region extending from the end part of the sensor part 12 on the side of the supporting member 81 to the end part of the first to fifth leading wires 71 to 75 on the side of the supporting member 81, the coating layer 203a is shrunk by heating, so that the coating layer 203a adheres to the sensor part 12, the supporting member 81 and the first to fifth leading wires 71 to 75. In the coating layer 203a after shrinking, an outer diameter of a part coating the board mounting part 102 is reduced. However, since the detection circuit unit 82 is arranged on the board mounting part 102, the detection circuit unit 82 is located at an area inside the base part 90 with respect to the attaching face 90a of the base part 90. Therefore, the contact of the coating layer 203a to the electric parts 142 in the circuit board 141 is suppressed, thereby suppressing the influence of the heat on the electric parts 142.

At the time of heating the jacket member 203, the melting layer 203b melts to be filled in gaps between the coating layer 203a and the circuit board 141, the supporting member 81, the sensor part 12 as well as the first to fifth leading wires 71 to 75. At this time, since the coating layer 203a is shrunk, the outer diameter of the part coating the board mounting part 102 is reduced. Therefore, a distance between the jacket member 203 and the circuit board 141 is shortened, so that the circuit board 141 can be easily coated with the melting layer 203b in a melted state.

As described above, the jacket member 203 coats the supporting member 81, the detection circuit unit 82, the end parts of the sensor part on the side of the supporting member 81, and the end parts of the first to fifth leading wires 71 to 75 on the side of the supporting member 81. The supporting member 81 supporting the detection circuit unit 82 is sealed within the jacket member 203.

Next, a method for manufacturing the foreign object detection sensor 201 comprising the sensor terminal 202 in the second embodiment will be explained.

At first, similarly to the first embodiment, a terminal material forming step is carried out and a terminal forming material 181 for providing the first to eighth terminals 91 to 98 is formed (cf. FIG. 13A and FIG. 13B).

Next, a base part forming step of forming the base part 90 in which the terminal forming material 181 partially embedded to be supported is carried out. In the second embodiment, this base part forming step corresponds to a supporting member forming step. In order to form the base part 90, a forming die (not shown) comprising a cavity for forming the base part 90 is used. After the terminal forming material 181 is provided in the cavity for forming the base part 90 of the forming die, a melt of an insulative resin material is filled in the cavity. Subsequently, the insulative resin material is solidified in the forming die, so that the base part 90 in which the terminal forming material 181 is partially embedded is completed. The completed base part 90 is taken out from the forming die.

The base part 90 is formed as described above, so that the terminal forming material 181 is insert-molded in the base part 90 and partially embedded in the base part 90. The formed base part 90 supports the terminal forming material 181 in such a manner that the longitudinal direction of the base part 90 coincides with the longitudinal direction of the terminal forming material 181. The base part 90 supports the first to eighth terminals 91 to 98 in such a manner that the adjacent terminal ends 91*a* to 98*a*, 91*b* and 96*b* separated by five are adjacently provided along the direction perpendicular to the longitudinal direction of the base part 90 (the same direction as the longitudinal direction of the sensor part 12 in the foreign object detection sensor 201) at both ends in the longitudinal direction of the base part 90 (the same direction as the longitudinal direction of the sensor part 12).

Next, a cutting step of cutting and removing a terminal connecting part 181*a* is carried out, so that the first to eighth terminals 91 to 98 are separated from each other (cf. FIG. 13B). Subsequently, an arrangement step similar to the first embodiment of disposing the detection circuit unit 82 with respect to the supporting member 81 is carried out. Thereafter, a connecting part connection step (connection step) similar to the first embodiment is carried out, and the respective connecting pins 91*d* to 98*d* inserted into the through-holes 143 are electrically connected to the respective through-holes 143 by soldering. After the connecting part connection step is carried out, a terminal end connection step (connection step) similar to the first embodiment is carried out, so that the first to fourth electrode wires 41 to 44, the detecting electrode 51, and the first to fifth leading wires 71 to 75 are electrically connected to the respective terminal ends 91*a* to 98*a*, 91*b* and 96*b* by resistance welding (cf. FIG. 6C as for the fourth electrode wire and the fourth leading wire 74).

Next, a coating step of coating the outer periphery of the supporting member 81 with the jacket member 203 is carried out. In the supporting member 81, the detection circuit unit 82 is assembled and the first to fifth leading wires 71 to 75 and the sensor part 12 are connected to the supporting member 81. In the coating step, the jacket member 203 comprising the cylindrical heat-shrinkable tube having no water permeability into which the support member 81 can be inserted is extrapolated to the supporting member 81, in which the detection circuit unit 82 is assembled and to which the first to fifth leading wires 71 to 75 and the sensor part 12 are connected. According to this step, a region extending from the end part of the sensor part 12 on the side of the supporting member 81 to the end part of the first to fifth leading wires 71 to 75 on the side of the supporting member 81 is coated with the jacket member 203. Then, the coating layer 203*a* is shrunk by heating the jacket member 203 such that the coating layer 203*a* adheres to the supporting member 81. At the time of heating the jacket member 203, the melting layer 203*b* melts to be filled in gaps between the coating layer 203*a* and the circuit board 141, the supporting member 81, the sensor part 12 as well as the first to fifth leading wires 71 to 75. The coating step is finished by completing the installation of the jacket member 203 to the supporting member 81, thereby completing the foreign object detection sensor 201.

As described above, according to the second embodiment, the functions and effects similar to the functions and effects (1) to (6), (8) to (11), (14) to (17) and (19) to (21) of the first embodiment can be obtained. In addition, following functions and effects can be obtained.

(1) Since the board mounting part 102 is formed as a recess by concaving a portion on the side of the attaching face 90*a* at one end of the base part 90 in the thickness direction of the base part 90, the detection circuit unit 82 is disposed at an area close to the inside of the base part 90. In addition, the electric parts 142 mounted on the side of the mounting face 102*a* in the circuit board 141 are located in the arrangement recess 102*b*. In general, when the jacket member 203 comprising the heat-shrinkable tube is shrunk by heating, if the coating layer 203*a* directly contacts with the electric parts 142 mounted on the circuit board 141, a lifetime of the solder which bonds the electric parts 142 with the circuit board 141 will be shortened by an effect of the heat transmitted from the coating layer 203*a*. Therefore, in the second embodiment, the detection circuit unit 82 is located inside the board mounting part 102 that is concaved in the base part 90, and so that the detection circuit unit 82 can be disposed at the area close to the inside of the base part 90. According to this structure, even if the cover 83 in the first embodiment is not provided, it is possible to suppress the direct contact of the coating layer 203*a* to the electric parts 142. In addition, the electric parts 142 between the circuit board 141 and the base part 90 are accommodated in the arrangement recess 102*b*, so that the coating layer 203*a* does not directly contact with the electric parts 142.

Further, since the board mounting part 102 is formed as a recess by concaving the portion on the side of the attaching face 90*a* at one end of the base part 90 in the thickness direction of the base part 90, an outer diameter of the coating layer 203*a* in an opening of the board mounting part 102 on the side of the attaching face 90*a* is reduced. Accordingly, an inner space in the coating layer 203 at a part surrounding the board mounting part 102 in the jacket member 203 is reduced, the melting layer 203*b* provided inside of the coating layer 203*a* is easily filled to bury a gap between the coating layer 203*a* and the detection circuit unit 82. As a result, it is possible to seal the sensor terminal 13 by using the jacket member 203 having the melting layer 203*b* effectively, thereby improving the reliability.

(2) Since the sensor terminal 13 does not comprise the cover 83, a cover assembly step of assembling the cover 83 to the supporting member 81 is omitted. Therefore, the number of steps for manufacturing the foreign object detection sensor 201 is reduced, thereby improving the productivity. In addition, a manufacturing cost can be reduced, since a material cost for forming the cover 83 can be reduced.

In addition, the embodiments of the present invention may be changed as follows.

In the aforementioned embodiments, the supporting member 81 is attached to the one end in the longitudinal direction of the sensor part 12 by inserting the inserting portion 101 into the separate hole 31*a* of the insulating layer 31 constituting the sensor part 12. However, a sensor attaching part integrally provided in the base part 90 for attaching the supporting member 81 to the sensor part 12 is not limited to a structure such as the inserting portion 101 in the aforementioned embodiments. It is sufficient if the sensor attaching part is configured to be engaged with the sensor part 12 at one end of the sensor part 12 in the longitudinal direction of the sensor part 12 such that the supporting member 81 can be attached to the one end of sensor part 12. By way of example only, the sensor attaching part may be integrally provided with the supporting member 81 and configured to be engaged with an outer periphery surface of the sensor part 12 at one end of the sensor part 12 in the longitudinal direction of the sensor part 12 such that the supporting member 81 can be attached to the sensor part 12. Further, the sensor attaching part may be configured such that the inserting portion 101 and the supporting member 81 can be attached to the one end of the sensor part 12 in the longitudinal direction, by utilizing a part provided separately from the supporting member 81.

In the first and second embodiments, the jacket member 151, 203 comprises the heat-shrinkable tube. However, it is sufficient if the jacket member 151, 203 comprises a material having no water permeability, which coats the supporting member 81, the detection circuit unit 82, the end part of the sensor part 12 on the side of the supporting member 81, and the end parts of the first to fifth leading wires 71 to 75. Accordingly, for example, the jacket member 151, 203 may comprise a synthetic resin material having insulative characteristics, which molds the supporting member 81, the detection circuit unit 82, the end part of the sensor part 12 on the side of the supporting member 81, and the end parts of the first to fifth leading wires 71 to 75. The same function and effect as those described in the item (15) in the first embodiment can be obtained even in this structure. In the first embodiment, the jacket member 151 may be omitted.

The detecting electrode 51 provided at the outer periphery of the insulating layer 31 holding the first to fourth electrode wires 41 to 44 is electrically connected to the terminal end 93*a*, among the five terminal ends 91*a* to 95*a* provided on the side of the sensor part 12 in the supporting member 81, which is disposed on the extended line of the central axis line L1 along the longitudinal direction of the sensor part 12, when viewed from the direction that is perpendicular to the adjacent arrangement direction of the five terminal ends 91*a* to 95*a* and perpendicular to the longitudinal direction of the sensor part 12. However, the detecting electrode 51 may be connected to any of the terminal ends 91*a*, 92*a*, 94*a* and 95*a*. The terminal end 93*a* may be disposed at a position shifted from the central axis line L1 along the longitudinal direction of the sensor part 12, when viewed from the direction that is perpendicular to the adjacent arrangement direction of the five terminal ends 91*a* to 95*a* and perpendicular to the longitudinal direction of the sensor part 12.

The configuration of the sensor part 12 is not limited to the configuration in the first and second embodiments. It is sufficient if the sensor part 12 is configured to detect the proximity of the foreign object X1 based on the change in electrostatic capacitance, and to detect the contact with the foreign object X1, X2. By way of example only, the sensor part 12 may comprises one center electrode, a pressure-sensitive rubber provided at an outer periphery of the center electrode, and a detecting electrode 51 provided at an outer periphery of the pressure-sensitive rubber. A resistance value of the pressure-sensitive rubber is changed when a pressing force is applied thereto. In this case, an electrostatic capacitance between the center electrode and the detecting electrode 51 is detected, and the proximity of the foreign object X1 is detected based on change in the electrostatic capacitance in accordance with approximation of the foreign object X1. In addition, the contact with the foreign object X1, X2 is detected based on a voltage value between the center electrode and the detecting electrode 51.

In the first embodiment, the base part 90 and the cover 83 are formed by integral molding in the base part forming step. The invention, however, is not limited thereto. The base part 90 and the cover 83 may be formed separately from each other.

In the first embodiment, the base part 90 and the cover 83 are made of the same material. The invention, however, is not limited thereto. The base part 90 and the cover 83 may be made of different materials.

In the first and second embodiments, the first to eighth terminals 91 to 98 are partially embedded (formed by insert-molding) in the base part 90 to be held by the base part 90. The invention, however, is not limited thereto. The first to eighth terminals 91 to 98 may be supported by the base part 90 without being embedded in the base part 90. By way of example only, the first to eighth terminals 91 to 98 may be fixed to the base part 90 by any of adhesion, snap-fit engagement, crimping, caulking, press-fitting and the like, to be supported by the base part 90.

In the first and second embodiments, the first terminal 91 is disposed to extend along the longitudinal direction of the sensor part 12 with respect to the base part 90, and the connecting part 91*c* extending along the longitudinal direction of the sensor part 12 is embedded in the base part 90. Further, the second electrode wire 42 and the first leading wire 71 are directly short-circuited by the first terminal 91. The invention, however, is not limited thereto. The voltage detecting signal S3 output from the electrode wire 42 may be output from the first leading wire 71 to the door ECU 171 via the detection circuit unit 82. By way of example only, the first terminal 91 may comprise two terminals, and the two terminals may be electrically connected to the circuit board 141, respectively. The electrode wire 42 is electrically connected to one of the two terminals, and the first leading wire 71 is electrically connect to another of the two terminals. In this configuration, the contact detecting function can be carried out similarly to the first and second embodiments.

In the first terminal 91, the connecting part 91*c* is embedded in the base part 90. The invention, however, is not limited thereto. It is not necessary to embed the connecting part 91*c* in the base part 90. In this case, the rigidity of the supporting member 81 can be increased by disposing the first terminal 91 with respect to the base part 90 in such a manner that the connecting part 91*c* abuts with the base part 90.

In the first and second embodiments, the terminal ends 91*a* to 98*a*, 91*b*, and 96*b* that are adjacent to each other in the shorter direction of the base part 90 are arranged to have the level differences therebetween in the thickness direction of the circuit board 141. However, the adjacent terminal ends 91*a* to 98*a*, 91*b*, and 96*b* may be arranged with no level difference (step portion) therebetween. In this case, the terminal ends 91*a* to 98*a*, 91*b*, and 96*b* that are adjacent to each other in the shorter direction of the base part 90 may be arranged in such manner the adjacent terminals do not contact with each other. When the terminal ends 91*a* to 98*a*, 91*b*, and 96*b* that are adjacent to each other in the shorter direction of the base part 90 are arranged to have no level difference therebetween, the terminal ends 91*a* to 98*a*, 91*b*, and 96*b* may be adjacently arranged in the direction perpendicular to the longitudinal direction of the sensor part 12. According to this structure, the same function and effect as those in the item (8) in the first embodiment can be obtained.

In the first and second embodiments, the terminal ends 91*a* to 98*a*, 91*b*, and 96*b* are adjacently provided by five in the direction perpendicular to the longitudinal direction of the sensor part 12 at the both end parts in the longitudinal direction of the base part 90. However, the arrangement of the terminal ends 91*a* to 98*a*, 91*b*, and 96*b* in the invention is not limited thereto. By way of example only, the terminal ends 91*a* to 98*a*, 91*b*, and 96*b* may be adjacently provided in the longitudinal direction of the sensor part 12.

In the first and second embodiments, the first second electric part-accommodating part 102*c* and the second electric part-accommodating part 102*d* are recesses (holes) concaved in the thickness direction of the base part 90 in the board mounting part 102 of the base part 90. The invention, however, is not limited thereto. The first and second electric part-accommodating parts 102*c*, 102*d* may be electric part 142 may be poriform or the like as long as the first and second electric part-accommodating parts 102*c*, 102*d* can accommodate at least a part of the electric part 142 which protrudes toward the base part 90 along the thickness direction of the circuit board 141 between the base part 90 and the circuit board 141. According to this structure, the same function and effect as those in the item (6) in the first embodiment can be obtained. Further, the base part 90 may be configured without comprising the first and second electric part-accommodating parts 102c, 102d.

In the first embodiment, the third electric part-accommodating part 83a and the fourth electric part-accommodating part 83b are recesses (holes) concaved in the thickness direction of the cover 83 at the inner periphery surface of the cover 83. The invention, however, is not limited thereto. The third and fourth electric part-accommodating parts 83a, 83b may be electric part 142 may be poriform or the like as long as the third and fourth electric part-accommodating parts 83a, 83b can accommodate at least a part of the electric part 142 which protrudes toward the cover 83 along the thickness direction of the circuit board 141 between the cover 83 and the circuit board 141. According to this structure, the same function and effect as those in the item (7) in the first embodiment can be obtained. Further, the base part 90 may be configured without comprising the third and fourth electric part-accommodating parts 83a, 83b.

In the first and second embodiments, the board mounting part 102 is formed as a recess by concaving a portion on the side of the attaching face 90a at one end of the base part 90 in the thickness direction of the base part 90. However, as long as the circuit board 141 can be mounted on the board mounting part 102 and supported by the board mounting part 102, the shape of the board mounting part 102 is not limited to a concave shape. By way of example only, the board mounting part 102 may be configured to have a convex shape protruding in the thickness direction of the base part 90 such that the circuit board 141 abuts with a tip portion (nose) surface of the board mounting part 102. In addition, the shape of the arrangement recess 102b is not limited to the shape in the first and second embodiments. By way of example only, the arrangement recess 102b may be an aperture which penetrates through the bottom plane of the board mounting part 102 in the thickness direction of the base part 90.

In the first and second embodiments, the electrical connection between the detection circuit unit 82 and the first to eighth terminals 91 to 98 is carried out inserting the connecting pins 91d to 98d into the through-holes 143 formed in the circuit board 141 and soldering the connecting pins 91d to 98d to the circuit board 141. However, the configuration for electrical connection between the detection circuit unit 82 and the first to eighth terminals 91 to 98 is not limited thereto. By way of example only, a female terminal may be arranged in the circuit board 141 and the electrical connection between the detection circuit unit 82 and the first to eighth terminals 91 to 98 may be carried out by inserting the connecting pins 91d to 98d into the female terminal.

In the first and second embodiments, the supporting member 81 comprises the first to eighth terminals 91 to 98, and the number of the terminals is eight. However, the number of the terminals provided in the supporting member 81 is not limited thereto. The number of the terminals may be appropriately changed in accordance with the number of the electrode wires 41 to 44, the detection electrode 51 and the first to fifth leading wires 71 to 75.

In the first and second embodiments, the electrode wires 41 to 44, the detection electrode 51 and the first to fifth leading wires 71 to 75 are electrically connected to the detection circuit unit 82 via the first to eighth terminals 91 to 98. The invention, however, is not limited thereto. The electrode wires 41 to 44, the detection electrode 51 and the first to fifth leading wires 71 to 75 may be electrically connected to the detection circuit unit 82 without using the first to eighth terminals 91 to 98.

The shape of the supporting member 81 is not limited to the shape in the first and second embodiments, as long as the support detection circuit unit 82 can be supported by the supporting member 81.

In the first and second embodiments, the electrode wires 41 to 44, the detection electrode 51 and the first to fifth leading wires 71 to 75 are electrically connected to the first to eighth terminals 91 to 98 by resistance welding. The invention, however, is not limited thereto. The electrode wires 41 to 44, the detection electrode 51 and the first to fifth leading wires 71 to 75 may be electrically connected to the first to eighth terminals 91 to 98 by fusion welding or soldering.

In the first and second embodiments, the detection circuit unit 82 constituting the sensor terminal 13, 202 includes the plurality of electric parts 142 composing constituting the driving circuit 80, and the determination section 163 is also provided in the detection circuit unit 82. The invention, however, is not limited thereto. The determination section 163 may be provided outside the sensor terminal 13, 202 and electrically connected to the detection circuit unit 82 by a leading wire.

The configuration of the sensor driving circuit 80 is not limited to the first and second embodiments, as long as the sensor driving circuit 80 can carry out the proximity detecting function and the contact detecting function by using the sensor part 12.

In the first and second embodiments, the foreign object detection sensor 11, 201 is provided in the electric sliding door apparatus 1 which electrically slides the door panel 5 of the vehicle 2, and the foreign object detection sensor 11, 201, and the foreign object detection sensor 11, 201 detects the foreign object X1, X2 that is in the proximity of or in contact with the front end portion 5a of the door panel 5. The invention, however, is not limited thereto the foreign object detection sensor 11, 201 may be provided in a opening and closing apparatus, which is opened and closed by an opening and closing member (e.g. opening and closing gear) for electrically operating an opening, other than the electric sliding door apparatus 1, and the foreign object detection sensor 11, 201 may be used for the purpose of detecting the foreign object X1, X2 existing between the a peripheral portion of the opening and the opening and closing member. In addition, the foreign object detection sensor 11, 201 may be provided in an apparatus other than the opening and closing member, and the foreign object detection sensor 11, 201 may be used for the purpose of detecting the proximity of the foreign object X1 to the sensor part 12 and the contact of the foreign object X1, X2 with the sensor part 12.

Although the invention has been described, the invention according to claims is not to be limited by the above-mentioned embodiments and examples. Further, please note that not all combinations of the features described in the embodiments and the examples are not necessary to solve the problem of the invention.

What is claimed is:
1. A foreign objection detection sensor comprising:
a lengthy sensor part comprising a sensor electrode comprising a first sensor electrode which detects a proximity of a foreign object and a second sensor electrode which detects a contact of the foreign object;
a sensor terminal part provided at one end of the sensor part;
a leading wire pulled out from the sensor terminal part, the leading wire being electrically connected to the sensor electrode at the sensor terminal part to provide a proximity detecting function for detecting the proximity of the foreign object to the sensor part and a contact detecting function for detecting the contact of the foreign object to the sensor part, wherein the sensor terminal part comprises a support member which supports a detection circuit unit electrically connected to the sensor electrode to carry out the proximity detecting function and the contact detecting function together with the sensor electrode, wherein the detection circuit unit is disposed in the support member.

2. The foreign object detection sensor according to claim 1, wherein the support member comprises terminals which electrically connect at least one of the leading wire and the sensor electrode to the detection circuit unit, and a base part which holds the terminals.

3. The foreign object detecting sensor according to claim 2, wherein the detection circuit unit comprises a circuit board comprising board-side connecting parts to which the terminals are electrically connected, and electric parts mounted on the circuit board and configured to carry out the proximity detecting function and the contact detecting function, wherein the terminals comprise terminal-side connecting parts to be electrically connected to the board-side connecting parts, respectively, wherein the base part comprises a board mounting part on which the circuit board is mounted, wherein the board mounting part holds the terminals such that the terminal-side connecting parts provided in the board mounting part are disposed in positions corresponding to the board-side connecting parts.

4. The foreign object detecting sensor according to claim 3, wherein a sensor electrode is electrically connected to the terminal by connecting a connecting line provided at an end part provided on a side of the sensor terminal in the sensor electrode to the terminals having a higher rigidity than a rigidity of the connecting line by welding, each of the board-side connecting parts comprises a through-hole, each of the terminal-side connecting parts comprises a pin-shape to be inserted to the through hole, and the terminal-side connecting parts respectively inserted into the board-side connecting parts are electrically connected to the circuit board via the board-side connecting parts by soldering.

5. The foreign object detecting sensor according to claim 3, wherein the board mounting part is formed as a recess by concaving a side face of the base part, an arrangement recess for accommodating the electric parts is formed as a recess at a bottom plate of the board mounting part, the detection circuit unit is disposed on the bottom plate of the board mounting part to abut the bottom plate, and the electric parts mounted on a side of the bottom plate of the board mounting part in the circuit board is disposed in the arrangement recess.

6. The foreign object detecting sensor according to claim 3, wherein the base part comprises an electric part-accommodating part for accommodating the electric parts protruding in the thickness direction of the circuit board toward the side of the base part.

7. The foreign object detecting sensor according to claim 2, wherein each of the terminals comprises a terminal end to which either the sensor electrode or the leading wire is connected, and adjacent terminal ends are adjacently provided in a direction perpendicular to a longitudinal direction of the sensor part.

8. The foreign object detecting sensor according to claim 2, wherein each of the terminals comprises a circuit board to which the terminals are electrically connected, each of the terminals comprising a terminal end to which either the sensor electrode or the leading wire is connected, wherein adjacent terminal ends are arranged to have level differences therebetween in a thickness direction of the circuit board.

9. The foreign object detecting sensor according to claim 2, wherein one of the terminals is disposed to extend along a longitudinal direction of the sensor part with respect to the base part, and one of the leading wires and the second sensor electrode are electrically connected to both end parts of the one of the terminals respectively.

10. The foreign object detecting sensor according to claim 2, wherein each of the terminals is partially embedded in the base part.

11. The foreign object detecting sensor according to claim 10, wherein the terminals comprises a pair of terminals provided at a side surface of the support member and connected to each other by a connecting part, and the connecting part is partially embedded in the base part.

12. The foreign object detecting sensor according to claim 2, wherein the sensor terminal comprises a cover to be assembled with the base part to cover the detection circuit unit.

13. The foreign object detecting sensor according to claim 12, wherein the cover comprises a material same as a material of the base part.

14. The foreign object detecting sensor according to claim 1, wherein the sensor part comprises a restorative hollow insulative member, the second sensor electrode comprises a plurality of sensor electrodes that are provided inside of the hollow insulative member along a longitudinal direction of the hollow insulative member while keeping an electrically non-contact state with each other, and the first sensor electrode is provided at an outer periphery surface of the hollow insulative member to provide an electrostatic capacitance between the second sensor electrode and the first sensor electrode and to provide a floating capacitance between the second sensor electrode and a conductive foreign object in a proximity of the sensor part.

15. The foreign object detecting sensor according to claim 1, wherein the supporting member comprises terminals which electrically connect at least one of the leading wire and the sensor electrode to the detection circuit unit, each of the terminals comprising a terminal end to which either the sensor electrode or the leading wire is connected, adjacent terminal ends being adjacently provided in a direction perpendicular to a longitudinal direction of the sensor part, in which one of the terminal ends to which the second sensor electrode is connected is disposed on an extended line of a central axis along a longitudinal direction of the hollow insulative member when viewed from a direction that is perpendicular to an adjacent arrangement direction of the terminal ends and perpendicular to the longitudinal direction of the hollow insulative member.

16. The foreign object detecting sensor according to claim 1, wherein the supporting member, the detection circuit unit, an end part of the sensor part on a side of the supporting member, and an end part of the leading wire on the side of the supporting member are coated with a jacket member.

17. The foreign object detecting sensor according to claim 1, wherein the supporting member comprises a sensor attaching part to be engaged with the sensor part at one end of the sensor part in a longitudinal direction of the sensor part such that the supporting member is attached to the one end of the sensor part.

18. A method for manufacturing a foreign objection detection sensor comprising a lengthy sensor part comprising a sensor electrode comprising a first sensor electrode which detects a proximity of a foreign object and a second sensor electrode which detects a contact of the foreign object, a leading wire pulled out from a sensor terminal part provided at one end of the sensor part, the leading wire being electrically connected to the sensor electrode at the sensor terminal part to provide a proximity detecting function for detecting the proximity of the foreign object to the sensor part and a contact detecting function for detecting the contact of the foreign object to the sensor part, the method comprising:
an arrangement step of arranging a detection circuit unit electrically connected to the sensor electrode to carry out the proximity detecting function and the contact detecting function together with the sensor electrode on a support member which constitutes the sensor terminal part; and
a connection step of electrically connecting the detection circuit unit to the sensor electrode in a state where the detection circuit unit is supported by the supporting member.

19. The method for manufacturing a foreign object detecting sensor according to claim 18 further comprising:
a support member forming step of forming the support member by holding terminals which electrically connect at least one of the leading wire and the sensor electrode to the detection circuit unit in a base part,
wherein the at least one of the leading wire and the sensor electrode is electrically connected to the detection circuit unit by the terminals.

20. The method for manufacturing a foreign object detecting sensor according to claim 19, wherein the detection circuit unit comprise a circuit board comprising board-side connecting parts to which the terminals are electrically connected, and electric parts mounted on the circuit board and configured to carry out the proximity detecting function and the contact detecting function,
wherein the terminal-side connecting parts provided in the terminals are engaged with the board-side connecting parts respectively in accordance with the arrangement of the circuit board on the board mounting part provided in the base part in the arrangement step.

21. The method for manufacturing a foreign object detecting sensor according to claim 20, wherein the terminal-side connecting parts having a pin-shape is inserted into the board-side connecting parts having a through-hole shape respectively in accordance with the arrangement of the circuit board on the board mounting part,
wherein the connection step comprises a connecting part connection step of electrically connecting the terminal-side connecting parts to the circuit board via the board-side connecting parts respectively by soldering, and a terminal part connection step of electrically connecting the sensor electrode to the terminals by connecting a connecting line provided at an end part provided on a side of the sensor terminal in the sensor electrode to the terminals having a higher rigidity than a rigidity of the connecting line by welding.

22. The method for manufacturing a foreign object detecting sensor according to claim 20, wherein, in the arrangement step, the circuit board is arranged on the board mounting part such that at least a part of the electric parts protruding in the thickness direction of the circuit board toward the side of the base part is accommodated in an electric part-accommodating part provided in the base part.

23. The method for manufacturing a foreign object detecting sensor according to claim 19, wherein, in the supporting member forming step, the terminals are held by the base part such that adjacent terminal ends are adjacently provided in a direction perpendicular to a longitudinal direction of the sensor part, and in the connection step, either the sensor electrode or the leading wire is connected to a terminal end of each of the terminals.

24. The method for manufacturing a foreign object detecting sensor according to claim 19, wherein the detection circuit unit comprises a circuit board to which the terminals are electrically connected, and electric parts mounted on the circuit board and configured to carry out the proximity detecting function and the contact detecting function,
wherein, in the supporting member forming step, the terminals are held by the base part such that adjacent terminal ends provided in the terminals have a level difference therebetween in a thickness direction of the circuit board, and in the connection step, either the sensor electrode or the leading wire is connected to a terminal end of each of the terminals.

25. The method for manufacturing a foreign object detecting sensor according to claim 19, wherein, in the support member forming step, each of the terminals is partially formed in the base part by insert-molding.

26. The method for manufacturing a foreign object detecting sensor according to claim 19, further comprising:
a cover assembling step of assembling a cover comprising a material same as a material of the base part with the base part to cover the detection circuit unit.

27. The method for manufacturing a foreign object detecting sensor according to claim 26, wherein, in the supporting member forming step, the base part and the cover are formed by integral molding, and the method further comprises a separation step of separating the base part and the cover by cutting after the supporting member forming step.

28. The method for manufacturing a foreign object detecting sensor according to claim 19, wherein the sensor part comprises a restorative hollow insulative member, the first sensor electrode comprises a plurality of sensor electrodes that are provided inside of the hollow insulative member along a longitudinal direction of the hollow insulative member while keeping an electrically non-contact state with each other, and the second sensor electrode is provided at an outer periphery surface of the hollow insulative member, and in the supporting member forming step, the terminals are held by the supporting member such that adjacent terminal ends of each of the terminals are adjacently provided in a direction perpendicular to a longitudinal direction of the sensor part, in which one of the terminal ends to which the second sensor electrode is connected is disposed on an extended line of a central axis along a longitudinal direction of the hollow insulative member when viewed from a direction that is perpendicular to an adjacent arrangement direction of the terminal ends and perpendicular to the longitudinal direction of the hollow insulative member, and in the connection step, the second sensor electrode is connected to the terminal end disposed on the extended line of the central axis along the longitudinal direction of the hollow insulative member.

29. The method for manufacturing a foreign object detecting sensor according to claim 18, further comprising:
a coating step by coating the supporting member, the detection circuit unit, an end part of the sensor part on a side of the supporting member, and an end part of the leading wire on the side of the supporting member with a jacket member having no water permeability after the connection step.

* * * * *